(12) United States Patent
Tatsukami

(10) Patent No.: US 7,502,223 B2
(45) Date of Patent: Mar. 10, 2009

(54) ELECTRONIC APPARATUS

(75) Inventor: Ikki Tatsukami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 229 days.

(21) Appl. No.: 11/656,521

(22) Filed: Jan. 23, 2007

(65) Prior Publication Data

US 2008/0043419 A1 Feb. 21, 2008

(30) Foreign Application Priority Data

Aug. 16, 2006 (JP) .............................. 2006-222129

(51) Int. Cl.
*G06F 1/16* (2006.01)
(52) U.S. Cl. ...................... 361/683; 361/685
(58) Field of Classification Search ................. 361/683, 361/685
See application file for complete search history.

(56) References Cited

U.S. PATENT DOCUMENTS

| | | | | |
|---|---|---|---|---|
| 5,095,405 A | * | 3/1992 | Ishida | 361/684 |
| 5,107,400 A | * | 4/1992 | Kobayashi | 361/685 |
| 5,124,887 A | * | 6/1992 | Kobayashi | 361/685 |
| 5,305,180 A | * | 4/1994 | Mitchell et al. | 361/685 |
| 5,311,455 A | * | 5/1994 | Ho | 361/685 |
| 5,331,509 A | * | 7/1994 | Kikinis | 361/686 |
| 5,905,632 A | * | 5/1999 | Seto et al. | 361/683 |
| 2006/0056143 A1 | * | 3/2006 | Tatsukami et al. | 361/683 |
| 2007/0091556 A1 | * | 4/2007 | Wu | 361/683 |

FOREIGN PATENT DOCUMENTS

| | | |
|---|---|---|
| JP | 2001-014839 | 1/2001 |
| JP | 2002-093501 | 3/2002 |
| JP | 2002-297263 | 11/2002 |
| KR | 1993-0004040 | 6/1993 |
| KR | 2004-0034194 | 4/2004 |

OTHER PUBLICATIONS

Office Action issued in corresponding Korean Patent Application No. 10-2007-0007952, mailed on Feb. 25, 2008.

* cited by examiner

*Primary Examiner*—Lisa Lea-Edmonds
(74) *Attorney, Agent, or Firm*—Staas & Halsey LLP

(57) ABSTRACT

A data processing apparatus includes: a housing including an opening formed therein for accommodating a unit that has a unit side connector; an apparatus side connector that is disposed at the back of the opening so as to be seen through the opening, and is to be connected with the unit side connector; and a projection for preventing wrong operation. The projection is formed at the side of the opening and projecting inside the opening. The projection evades interference with the unit when the unit is placed in the opening in a normal posture to be inserted in the apparatus side connector, while the projection interferes with the unit when the unit is pressed toward the apparatus side connector while at least the front end of the unit is lifted.

6 Claims, 40 Drawing Sheets

ELECTRONIC APPARATUS

CROSS REFERENCE TO RELATED APPLICATIONS

This application claims the benefit under 35 U.S.C. Section 119, of Japanese Patent Application No. 2006-222129, filed Aug. 16, 2006, which is hereby incorporated by reference in its entirety into this application.

BACKGROUND OF THE INVENTION

1. Field of the Invention

The present invention relates to an electronic apparatus that is provided with a unit such as a hard disc unit.

2. Description of the Related Art

Conventionally, a data processing apparatus such as a notebook personal computer (hereafter referred to as "note PC") has a built-in hard disc unit that houses a hard disc therein. As accessing the hard disc housed in a hard disc unit is accompanied by mechanical movement, a hard disc unit is vulnerable to a failure. Therefore, a typical note PC is configured such that an opening for housing a hard disc unit is formed in the bottom face thereof to allow detachable housing of the hard disk unit and a connector of the hard disc unit(hereafter referred to as "a unit side connector") is connected with a connector of the note PC (hereafter referred to as "an apparatus side connector).

In order to obtain correct connection between the unit side connector and the apparatus side connector, a hard disc should be placed horizontally in the opening for the hard disc unit and then pushed to slide along the opening.

However, due to the demand for miniaturization of a note PC as a whole, an opening for loading a hard disk unit is also limited in space. Such a situation entails a problem that a disc unit is inserted obliquely to cause damage of the connector, or wrong connection of the connectors is unnoticed to cause malfunction of the note PC.

In order to deal with such a problem, Japanese Patent Application Publication No. 2002-93501 discloses that an opening for receiving connector pins of the hard disk unit is also formed in the top surface, in addition to the side surface, of the connector of the apparatus side, thereby reducing the size of the opening for loading the hard disc unit. Although this technique achieves the reduction in size of the opening for the hard disk unit, it does not eliminate the possibility of inserting the hard disc unit obliquely.

On the other hand, Japanese Patent Application Publication No. 2001-14839 discloses that a projection formed on the front end of the connector of the hard disk unit, abuts the connector of the apparatus when the hard disk unit is to be obliquely inserted, thereby preventing wrong connection between the connectors. This technique prevents wrong connection of the connectors when the hard disk unit is inserted obliquely, thereby preventing the damage of the connector. However, connector pins of the hard disk unit are usually aligned in two rows which are received by the corresponding insertion holes aligned in two rows. Accordingly, the technique disclosed in Japanese Patent Application Publication No. 2001-14839 does not prevent wrong connection of the connectors in a case where connector pins aligned in the lower row are inserted in the insertion holes in the upper row of the apparatus side-connector.

Additionally, Japanese Patent Application Publication No. 2002-297263 discloses space-saving structure in which a case housing multiple hard disc devices is adapted to be pulled, but does not relate to prevention of wrong connection of connectors.

SUMMARY OF THE INVENTION

The present invention has been made in view of the above circumstances, and provides an electronic apparatus having a unit is housed in an opening of the apparatus and whose connector is to be connected to a connector of the apparatus, and prevents wrong connection and damage of the connectors.

An electronic apparatus according to the invention having:

a housing including an opening formed therein for accommodating a unit that has a unit side connector;

an apparatus side connector that is disposed at the back of the opening so as to be seen through the opening, and is to be connected with the unit side connector; and a projection that prevents wrong operation, the projection protruding from a sidewall of the opening toward inside the opening, the projection evading interference with the unit when the unit is placed in the opening in a normal posture and inserted in the apparatus side connector, the projection interfering with the unit when the unit is pressed toward the apparatus side connector, while at least an end of the unit, which is positioned opposite the unit side connector, is lifted.

Incidentally, the expression of "at least an end of the unit, which is positioned opposite the unit side connector, is lifted" includes both states that the unit is lifted obliquely and that the unit is lifted in a horizontal posture.

As the electronic apparatus of the invention has the above structured projection, wrong connection can be prevented when the unit is obliquely lifted as well as when the unit is lifted in a horizontal, thereby preventing malfunction and damage of the connector. Additionally, also at disengagement, the projection interferes with obliquely pulling of the connected connector, thereby preventing occurrence of failure.

Preferably, the projection is formed at each of both side walls of the opening.

As the projections formed at both side walls interfere with the unit at both sides, oblique force, which may be applied in the case where the projection is disposed only on one side, can be prevented.

More preferably, the unit has a metal frame with an interfering section that interferes with the projection when the unit is pressed against the apparatus side connector while at least a front end of the unit is lifted.

As the unit has a metal frame, the interfering section corresponding to the projection may be provided in the metal frame while the body of the unit is not modified. This suppresses increase in the number of modifications with respect to the conventional apparatus.

Additionally, the electronic apparatus according to the invention, the unit side connector may have plural connection pins aligned in upper and lower rows, and the apparatus side connector may have plural insertion holes aligned in upper and lower rows in which the connection pins aligned in the upper and lower rows are inserted respectively. Further, the unit may have a built-in hard disc and accesses the hard disc.

Desirably, the invention can be applied to, for example, a note PC that includes:

a main unit that serves for data processing and has a keyboard at a top surface thereof, the keyboard having aligned keys for input operation; and a display unit that has a display screen for displaying an image and is connected via a hinge to the main unit at the back of the main unit so as to be openable and closable relative to the main unit, wherein the opening is formed in a bottom surface of the main unit.

The removal of the above unit such as a hard disc unit is not performed often, and thus the unit is disposed on the bottom surface, which does not interfere with operation.

As described above, the electronic apparatus according to the invention can prevent wrong connection and damage of the connectors.

BRIEF DESCRIPTION OF THE DRAWINGS

Embodiment(s) of the present invention will be described below with reference to the attached drawings.

DETAILED DESCRIPTION OF THE INVENTION

Embodiment(s) of the present invention will be described below with reference to the attached drawings.

Figure 1:
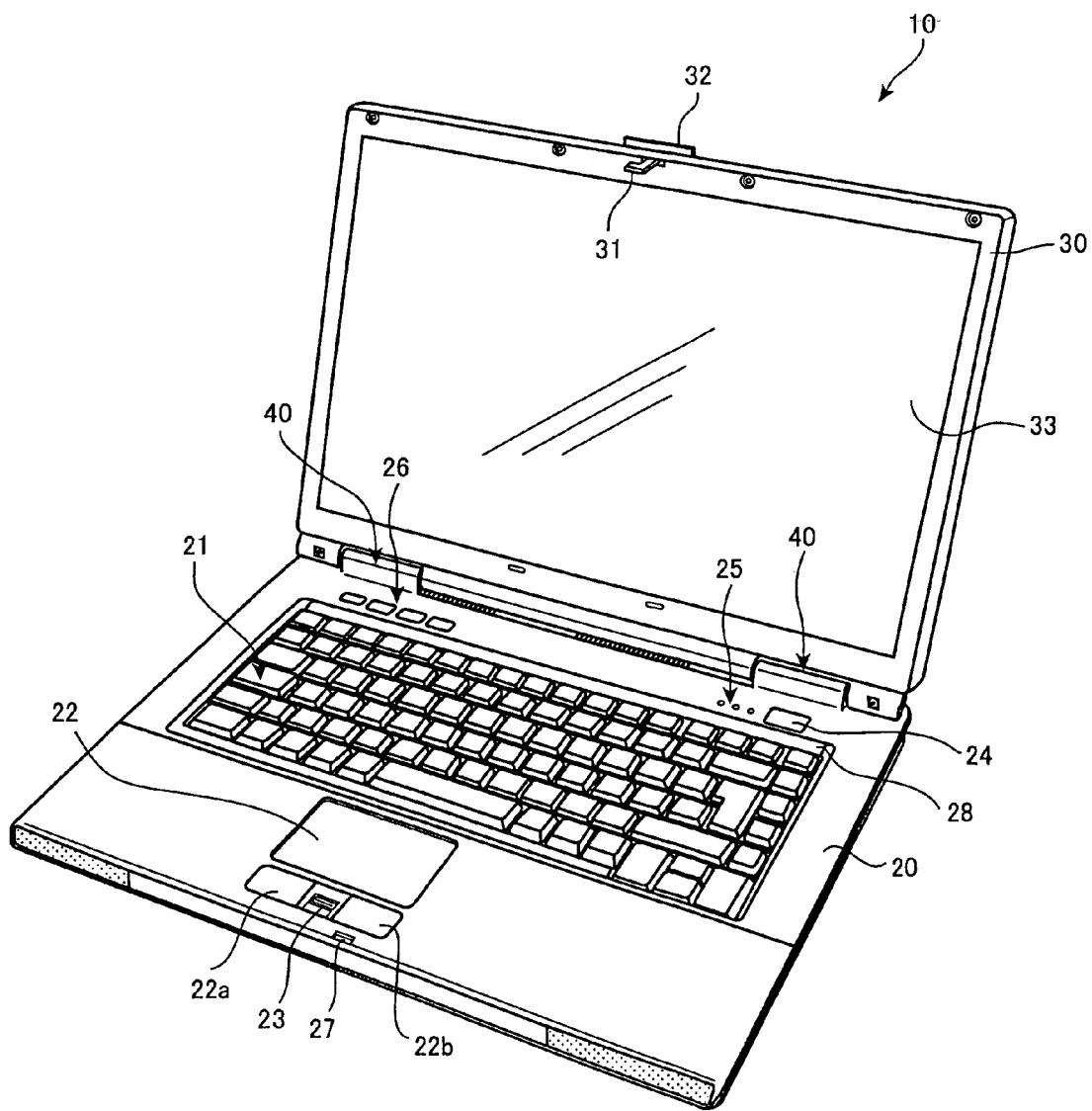
FIG. 1 is a perspective view of a notebook computer (hereafter referred to as note PC) when opened.
Figure 2:
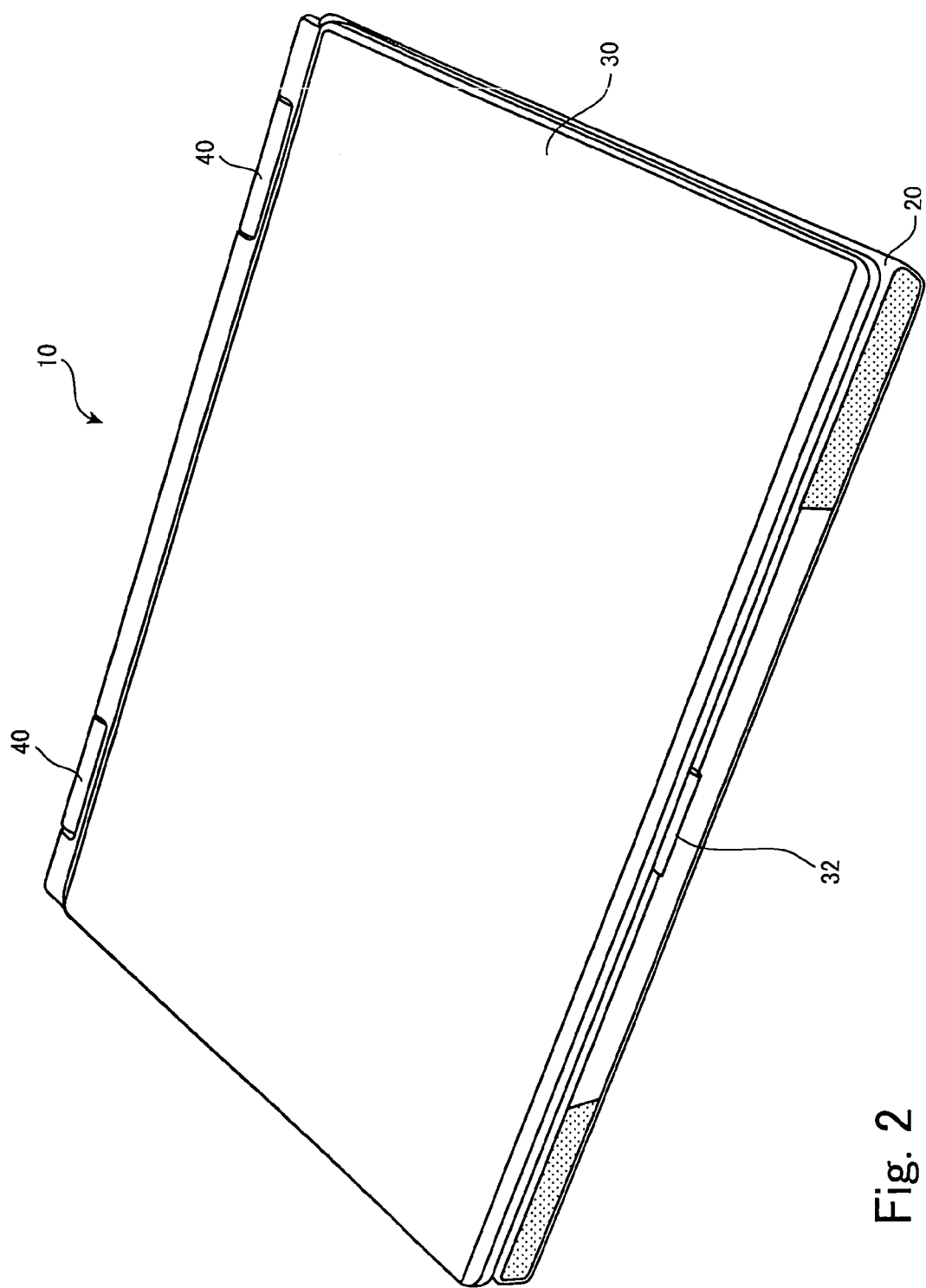
FIG. 2 is a perspective view of the note PC shown in FIG. 1 when closed, as viewed obliquely from its front.
Figure 3:
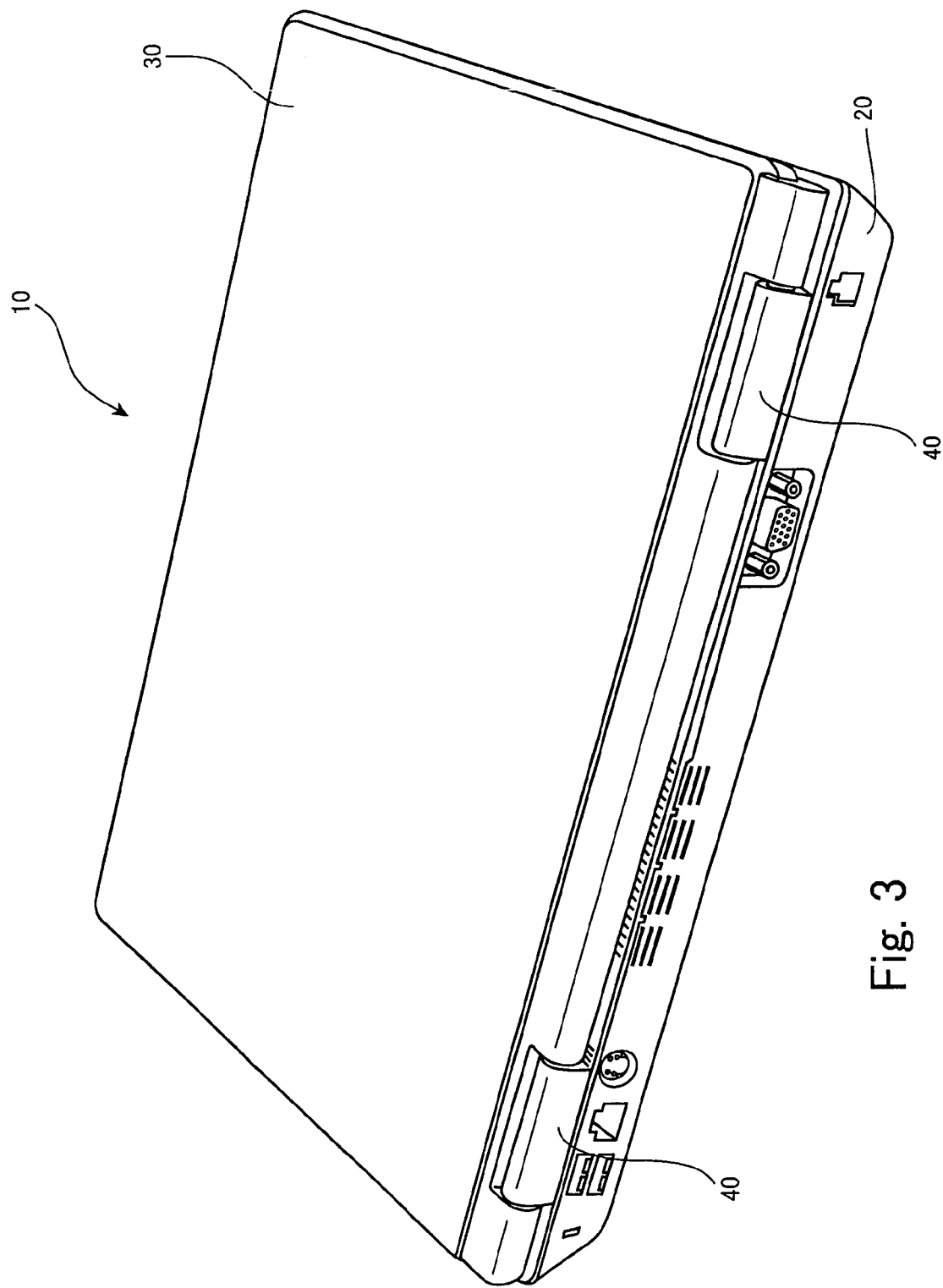
FIG. 3 is a perspective view of the note PC shown in FIG. 1 when closed, as viewed obliquely from its back.

FIG. 1 is a perspective view of a notebook computer 10 (hereafter referred to as a notebook PC) when closed, FIG. 2 is a perspective view of the notebook PC 10 when closed, as viewed obliquely from its front, and FIG. 3 is a perspective view of the notebook PC 10 when closed, as viewed obliquely from its back.

The notebook PC 10 is composed of a main unit 20 and a display unit 30. The display unit 30 is connected via a hinge mechanism 40 with the main unit 20 at the back of the main unit 20 so as to be openable and closable.

The main unit 20 has various components incorporated in the housing thereof, including circuits such as CPU, a hard disc drive unit to access a CD and a DVD loaded therein, a PC card slot to access a PC card inserted therein, a memory card slot to access various kinds of memory cards inserted therein and so on.

On the top face of the main unit 20, disposed are a keyboard 21, a touchpad 22, right and left push buttons 22b and 22a, a fingerprint sensor 23 disposed between the push buttons 22b and 22a, a power button 24 disposed at the right back, plural indicator lamps 25 and plural function buttons 26 disposed at the left back.

Further disposed on the top face of the main unit 20 are a locking aperture 27 at a substantial center of the front thereof. The locking aperture 27 receives a locking claw 31 of the display unit 30, when the display unit 30 is closed to be overlaid over the main unit 20, and the display unit 30 locks into the main unit 20 such that the display unit 30 does not easily open. To open the display unit 30, an unlocking button 32 of the display unit 30 is to be pressed to unlock the locking claw 31 and the display unit 30 is to be lifted with a hand. Additionally, a long and narrow cover member 28 extending laterally is disposed at the back of the keyboard 21 on the top face of the main unit 20, which will be described later in detail.

The display unit 30 has, in addition to the locking claw 31 and the unlocking button 32, a display screen 33 disposed at the inside thereof and facing the main unit 20 when closed. Various images are displayed on the display screen 33 in response to instructions from the CPU of the main unit 20.

The hinge mechanism 40 supports the display unit 30 such that the display unit 30 can open and close relative to the main unit 20 and can be kept opening at any degree by friction of the hinge mechanism 40.

Figure 4:
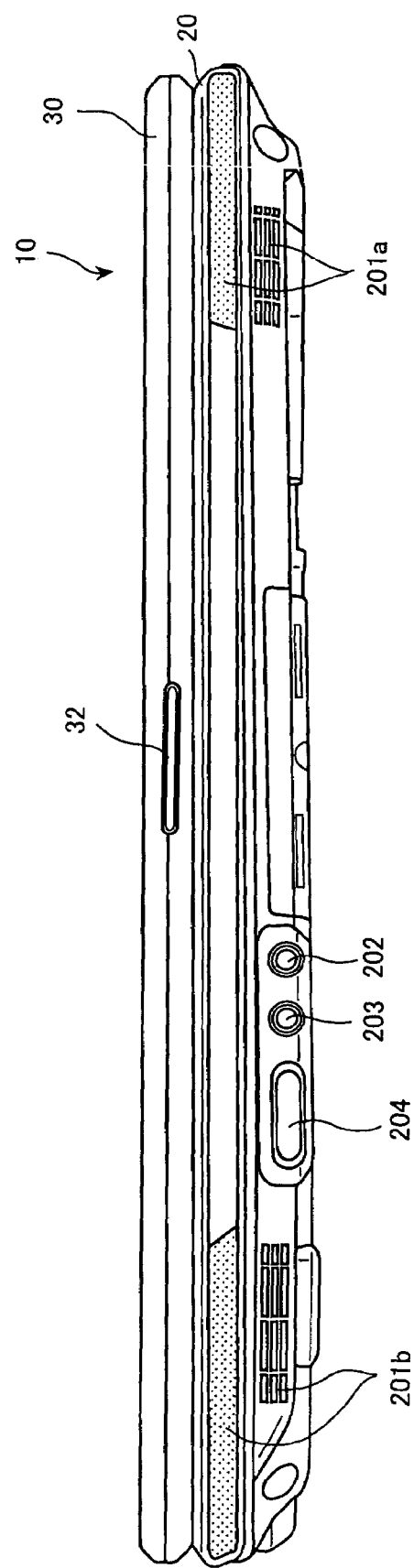
FIG. 4 shows a front face of the note PC shown in FIGS. 1 through 3 when closed.

FIG. 4 shows a front face of the notebook PC 10 shown in FIGS. 1 through 3 when closed.

On the flank of the front of the main unit 20, audio output ports 201a, 201b are disposed respectively at the left and right thereof to output sound from a built-in microphone to outside the apparatus. Further, disposed are a microphone connection port 202 for connecting a microphone jack thereto, a headphone connection port 203 for connecting a headphone jack thereto, and an On/Off switch 204 for turning on/off wireless LAN function.

Figure 5:
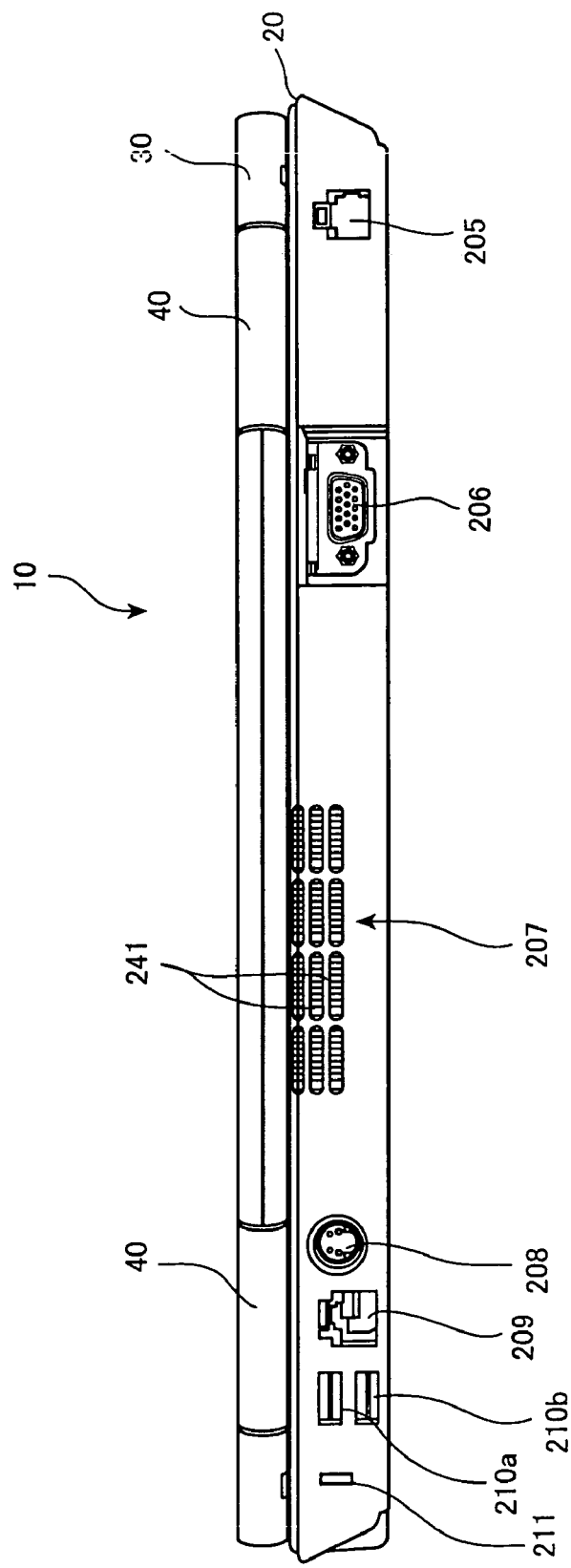
FIG. 5 shows a back face of the note PC shown in FIGS. 1 through 3 when closed.

FIG. 5 shows a back face of the notebook PC 10 shown in FIGS. 1 through 3 when closed.

As shown in FIG. 5, on the flank of the back of the main unit 20, disposed in the order from the right to the left are a modem circuit connecting port 205, an external monitor connecting connector 206, air outlets 207 from which air blown from a fan inside the main unit 20 is discharged, a video output terminal 208, a LAN connection terminal 209, two USB connection terminals 210a, 210b and a locking aperture 211 for connecting a theft-proof wire thereto.

It should be noted that in FIG. 5 heat radiating fins 241 of a heat radiating member 240 (see FIG. 11) are exposed to be seen at the back of the air outlets 207.

Figure 6:
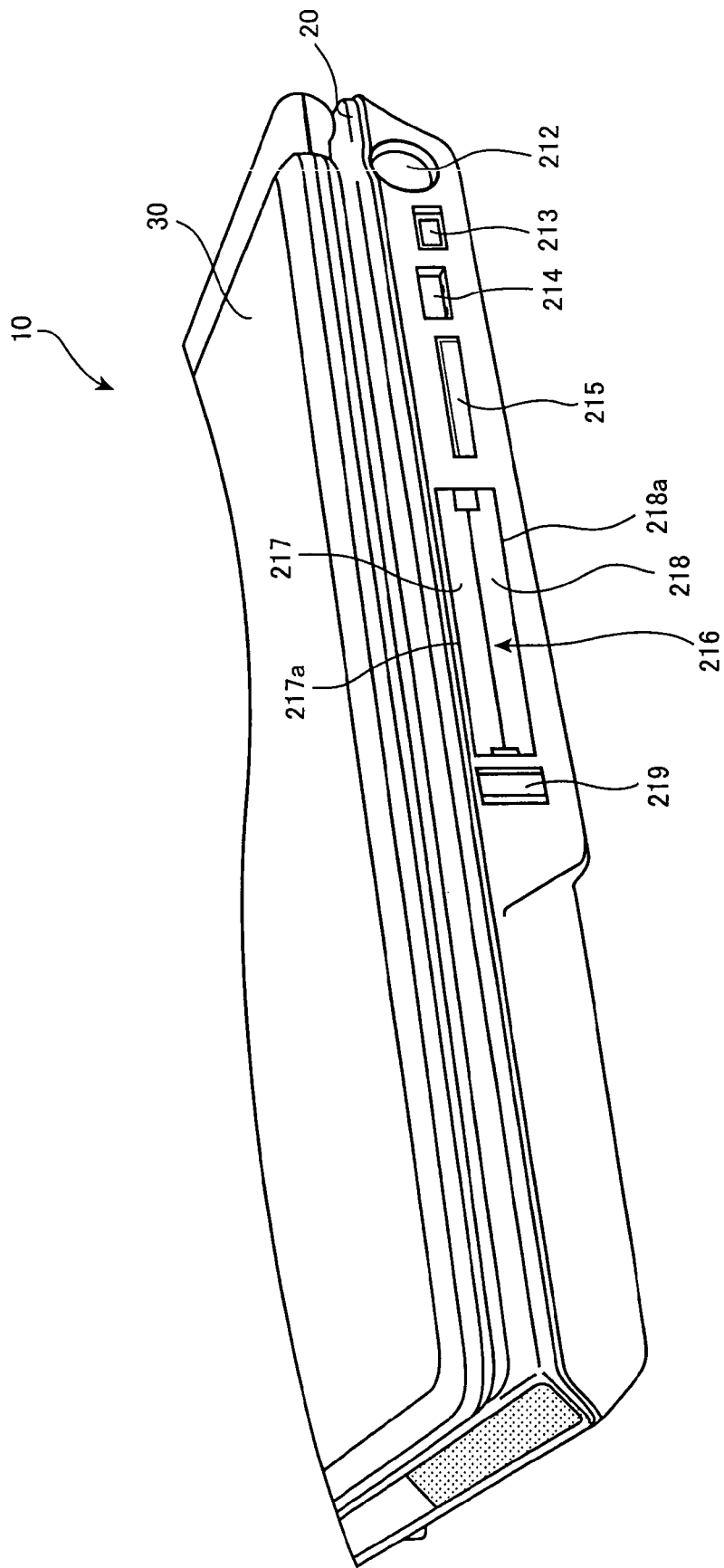
FIG. 6 shows a right flank of the note PC shown in FIGS. 1 through 3 when closed.

FIG. 6 shows a right flank of the notebook PC 10 shown in FIGS. 1 through 3 when closed.

As shown in FIG. 6, on the flank of the right of the notebook PC 10, there are disposed an AC adopter (not shown) power cable connecting port 212, an IEEE 1394 connecting terminal 213, a USB connecting terminal 214, a media loading opening 215 in which plural types of storage media, tour in the embodiment, can be inserted, and a PC card loading opening 216 in which plural PC cards are to be inserted. As will be described later, in the main unit 20, upper and lower PC card slots capable of accommodating two PC cards and having corresponding upper and lower cover members 217 and 218 are disposed inside the PC card loading opening 216. When no PC card is loaded, the cover members 217 and 218 are pressed by a spring from inside the housing of the main unit 20 so as to be closed, as shown in FIG. 6. The notebook PC card loading opening 216 is adopted to be opened in the following manner: when a PC card is inserted into the upper PC slot, the upper cover member 217 is pressed by the front end of the PC card and rotated such that the upper cover member 217 is lifted up around a top edge 217a thereof; on the other hand, when a PC card is inserted into the lower PC slot, the lower cover member 218 is pressed by the front end of the PC card and rotated such that the lower cover member 218 goes down around a bottom edge 218a thereof. In order to pull the inserted PC card from the PC card loading opening 216, an eject button 219 disposed next to the PC card loading opening 216 is to be pressed.

Figure 7:
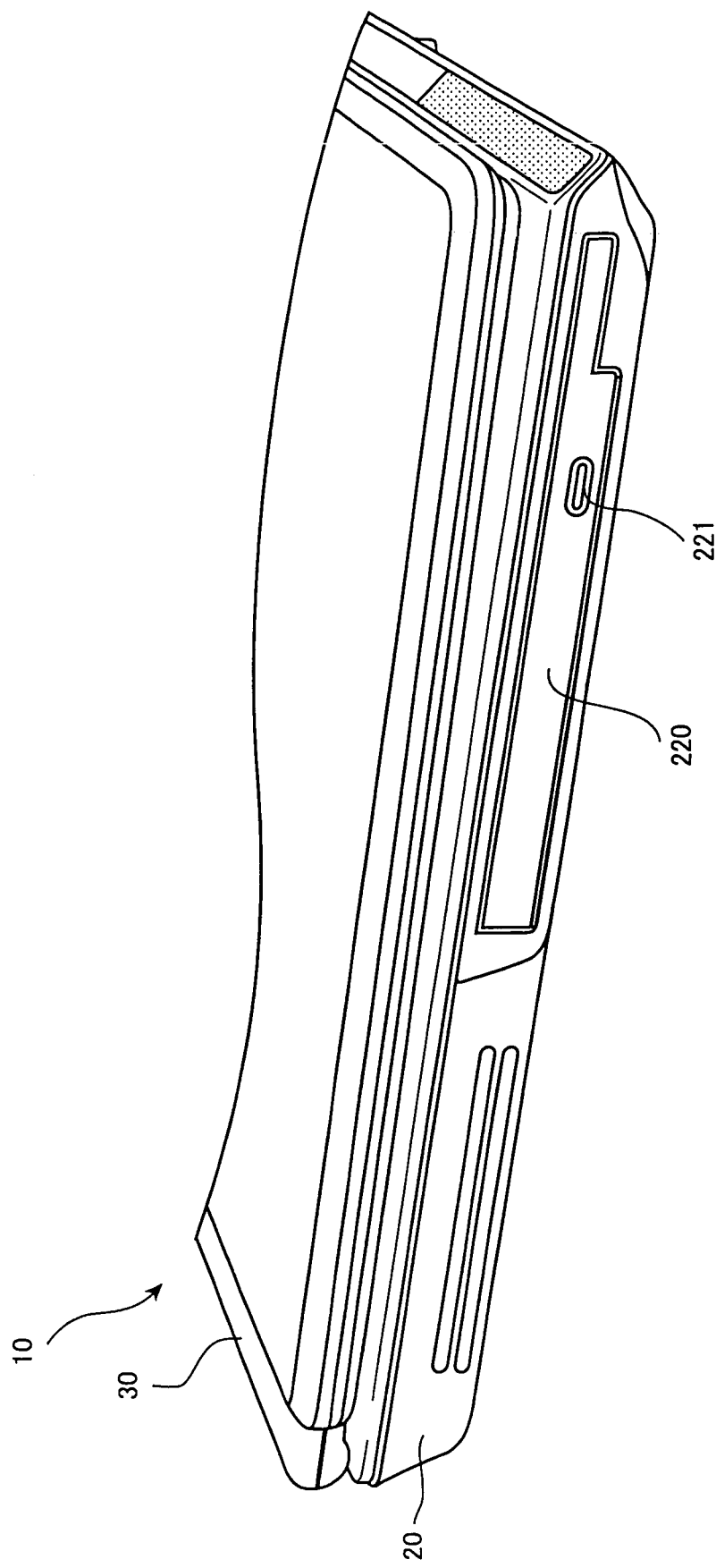
FIG. 7 shows a left flank of the note PC shown in FIGS. 1 through 3 when closed.

FIG. 7 shows a left flank of the notebook PC 10 shown in FIGS. 1 through 3 when closed.

On the flank of the left of the main unit 20, arranged is an end face of a disc drive unit 220 to access a CD and a DVD loaded therein. Pressing an eject button 221 causes a tray to pop out from inside the housing of the main unit 20. Placing CD and DVD on the tray and pushing it enables the CD and DVD to be accessed by the disc drive unit 220. When removing the CD and DVD, the eject button 221 is to be pressed similarly.

Incidentally, an opening of the same shape as that of the end face of the disc drive unit 220 is formed in the housing of the main unit 20. Thus, when doing a maintenance check, the whole of the disc drive unit 220 can be pulled out from inside the housing of the main unit 20 and reinserted therein.

So far, the notebook PC 10 as a whole has been described. In the following, the details of each section of the notebook PC 10 will be described.

(Structure of Air Inlet Portion of Heat Radiating Fins)

Figure 8:
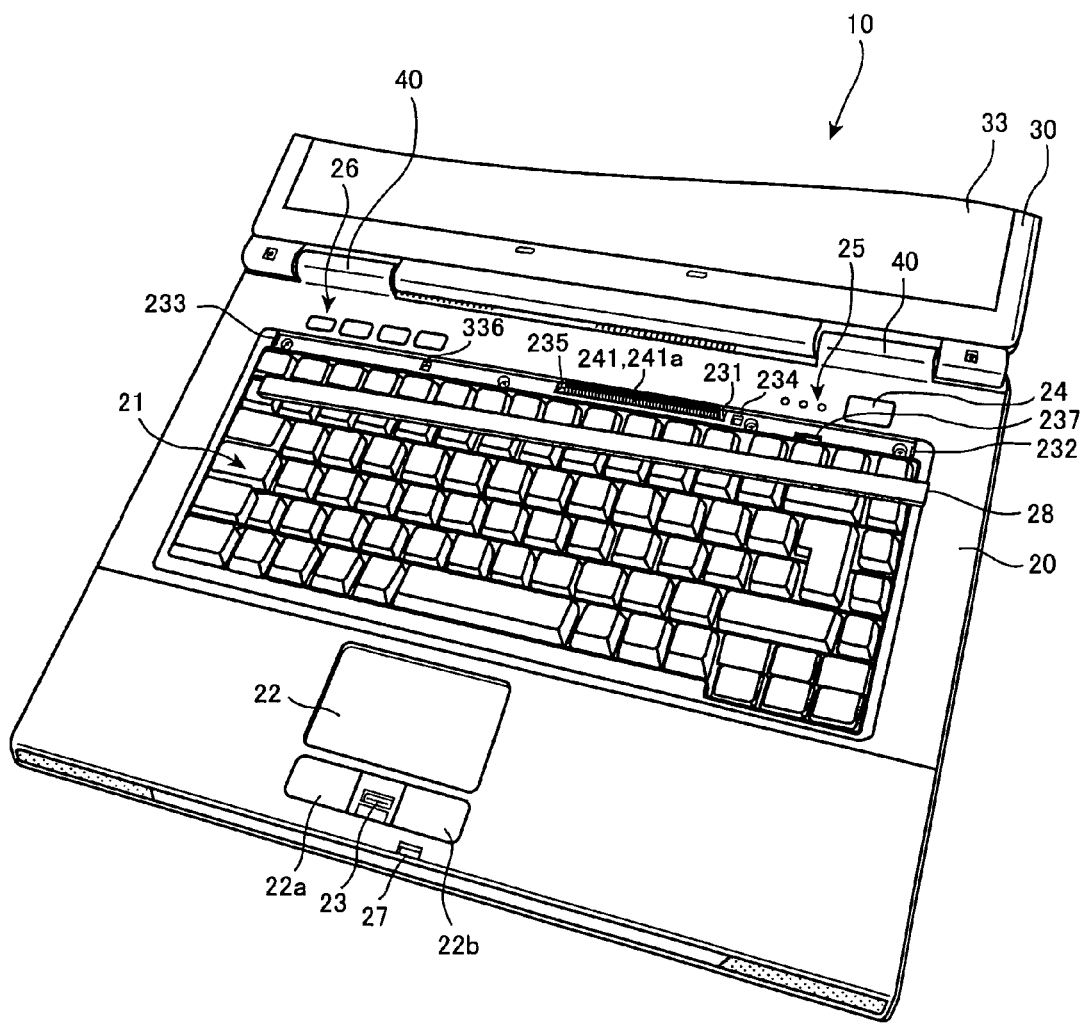
FIG. 8 shows a top face of the note PC shown in FIGS. 1 through 3 with its cover member removed therefrom.
Figure 9:
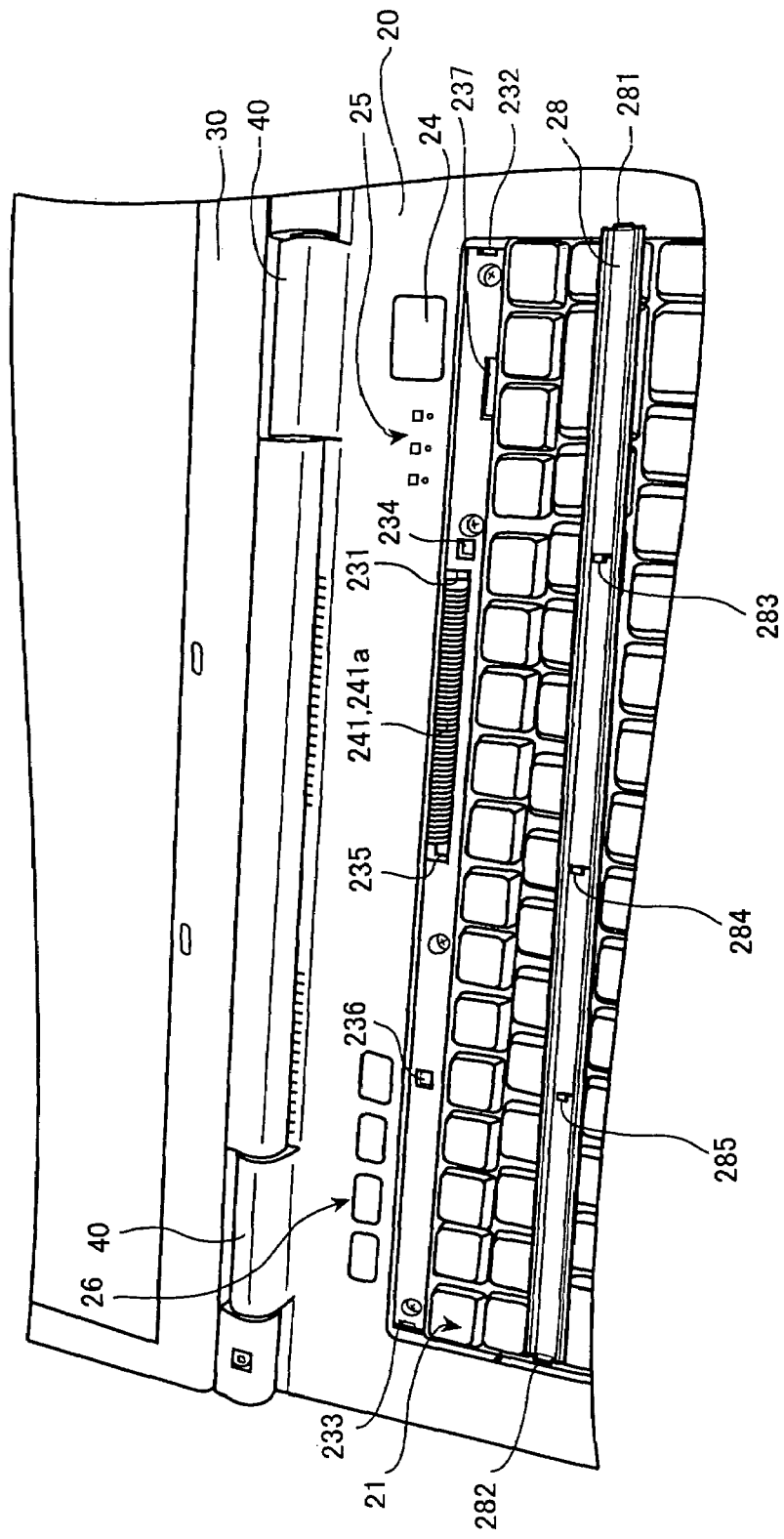
FIG. 9 is an enlarged view of a portion at the back of a keyboard on the top face of a main unit of the note PC.

FIG. 8 shows a top face of the notebook PC 10 shown in FIGS. 1 through 3 with its cover member removed therefrom. FIG. 9 is an enlarged view of a portion at the back of a keyboard 21 on the top face of the main unit 20 of the notebook PC 10.

An elongated cover member 28, as shown in FIG. 1, is disposed at the back of the keyboard 21 on the top face of the main unit 20. Opening the cover member 28 exposes an opening 231 formed inside the housing of the main unit 20. An air inlet portion 241a of the heat radiating fins 241 of the heat radiating member 240 (see FIG. 11) can be seen through the opening 231. The heat radiating member 240 will be described later in detail. The air inlet portion 241a is likely to be covered in dust because air from the fan 250 blows against it. The accumulated dust in the air inlet portion 241a prevents air flow from the fan 250, downgrading coolability, leading to rise in temperature inside the housing of the main unit 20 and thus possibly resulting in malfunction and failure of the notebook PC 10. However, the notebook PC 10 has such a configuration that the air inlet portion 241a can be exposed by taking off the cover member 28 to enable easy removal of dust accumulated therein. The opening 231, through which the air inlet portion 241a of the heat radiating fins 241 can be seen, is closed by the cover member 28, whose backside is shown in FIG. 9, which has positioning claws 281 and 282 at ends thereof and locking claws 283, 284 and 285 at three separate positions at substantially center thereof.

The positioning claws 281 and 282 engage in positioning holes 232 and 233 formed in the housing of the main unit 20 while the locking claws 283, 284 and 285 respectively engage in locking holes 234, 235 and 236 formed in the housing of the main unit 20, so that the cover member 28 is attached to the housing of the main body so as to close the opening 231.

Additionally, a recess 237 with space for a finger or a nail to be placed therein is formed in the housing of the main unit 20 in order to enable easy taking off of the cover member 28 attached to the housing. Thus, the cover member 28 can be easily taken off by placing a finger or a fingernail under the recess 237 and lifting up the cover member 28.

Figure 10:
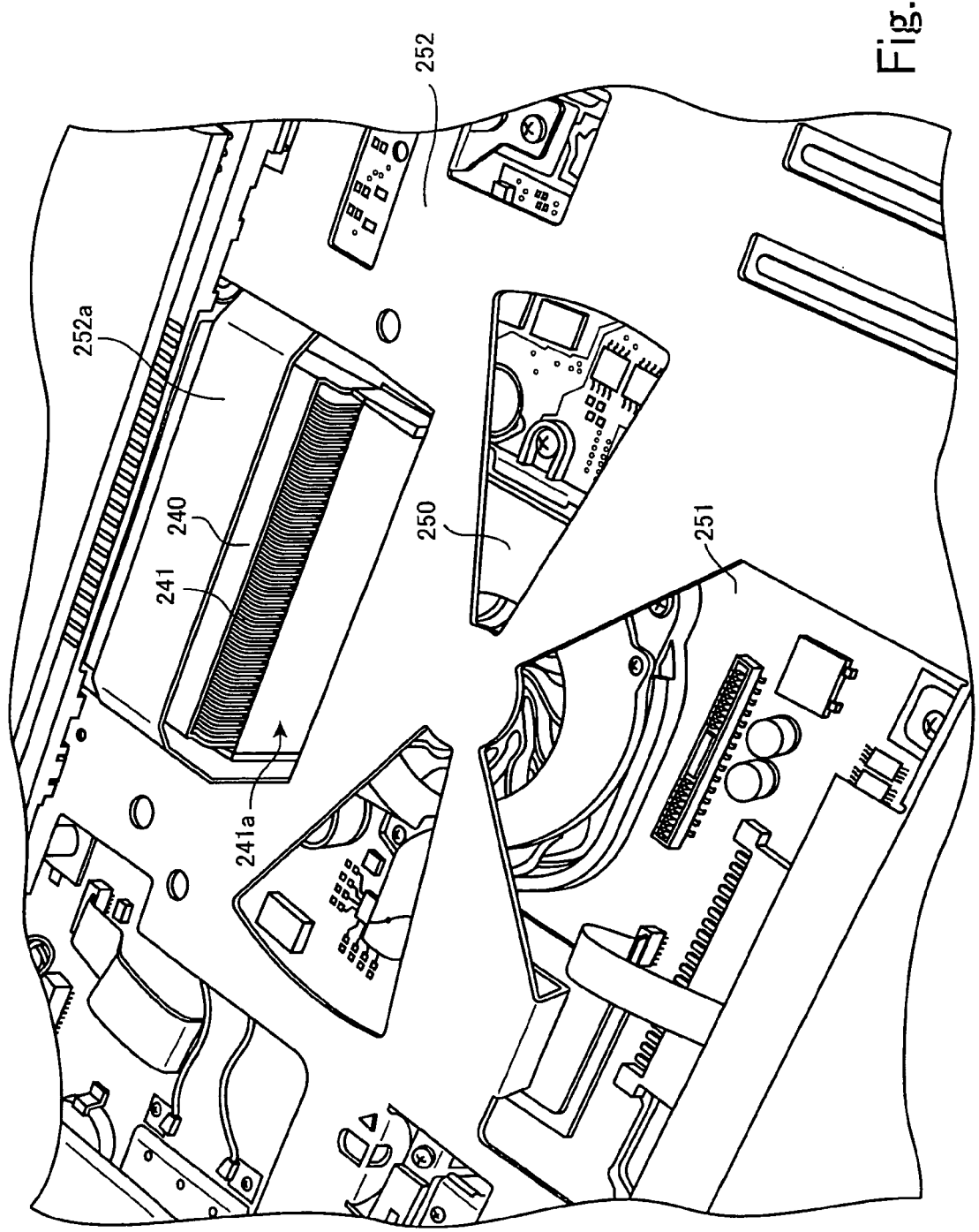
FIG. 10 illustrates a fan and a portion of a heat radiating member with a top cover and a keyboard removed from the housing of the main unit.
Figure 11:
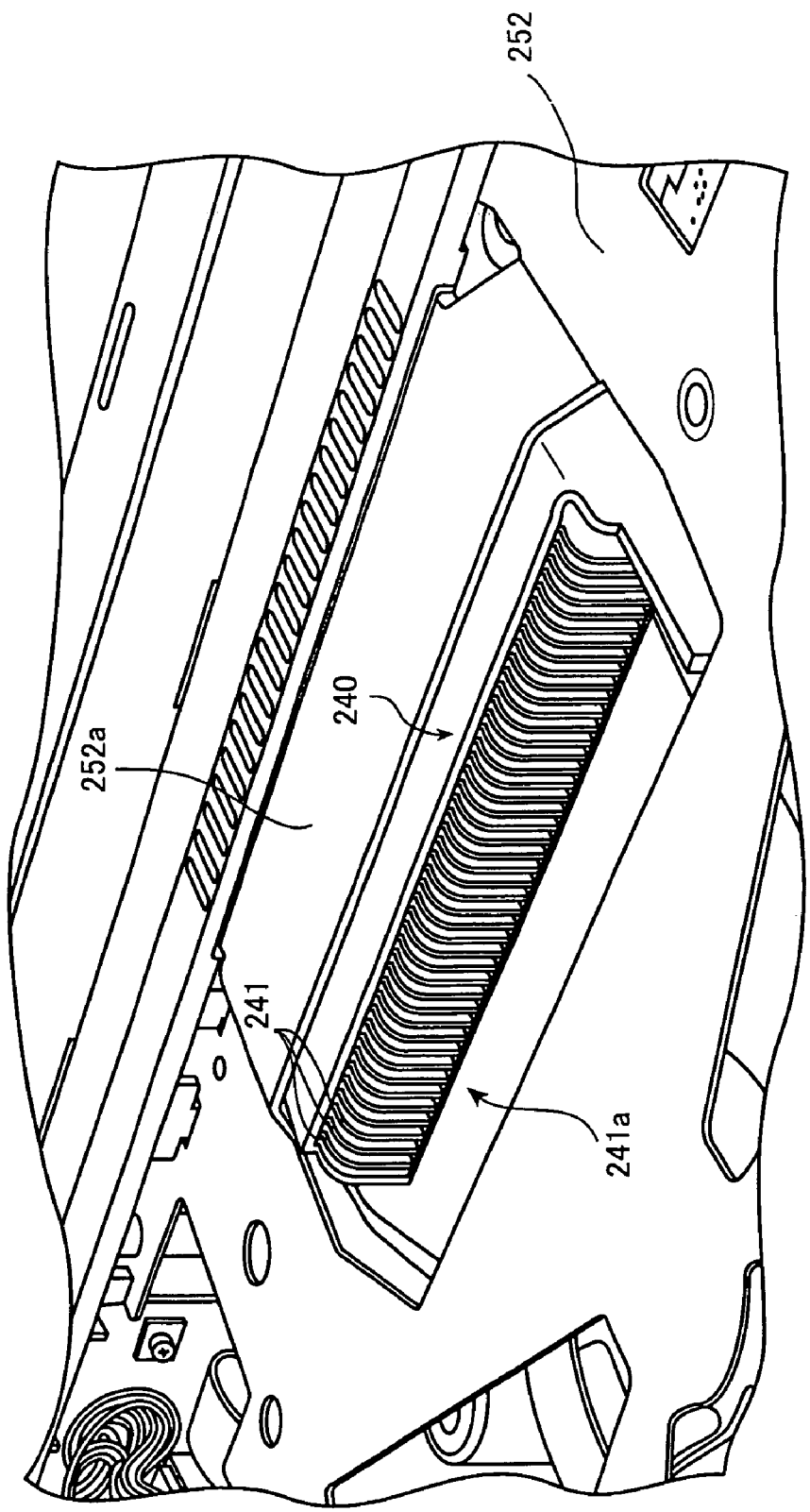
FIG. 11 illustrates the portion of the heat radiating member as viewed at different angle from that in FIG. 10.

FIG. 10 illustrates a fan and a portion of the heat radiating member 240 with a top cover and the keyboard 21 of the main unit 20 removed therefrom. FIG. 11 illustrates the portion of the heat radiating member 240 as viewed at different angle from that in FIG. 10.

A main circuit board 251 mounted with various circuit components is arranged around the fan 250. A metal plate 252 with several holes formed therein is arranged above the fan 250, the main circuit board 251, and the heat radiating member 240. A top face of the heat radiating member 240 stands higher than that of the fan 250, so that a shield portion 252a formed in the metal plate 252 for covering the top face of the heat radiating member 240 is raised from the level of the rest of the metal plate 252.

The metal plate 252 serves as an electromagnetic shield as well as a base for the keyboard 21 (see FIG. 1) that is arranged on the metal plate 252.

Figure 12:
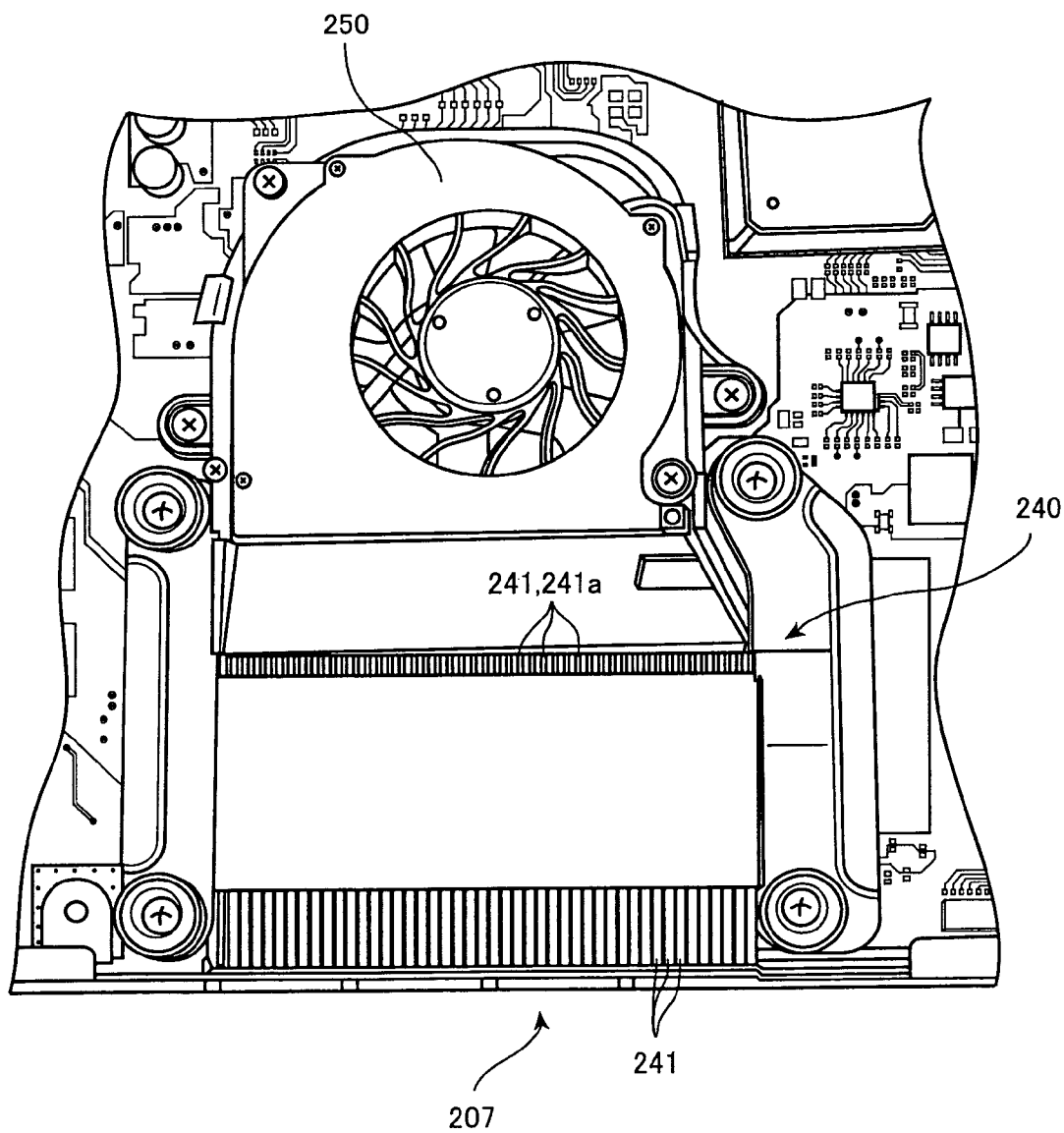
FIG. 12 shows a positional relationship between the fan and the heat radiating member with a metal plate removed therefrom.
Figure 13:
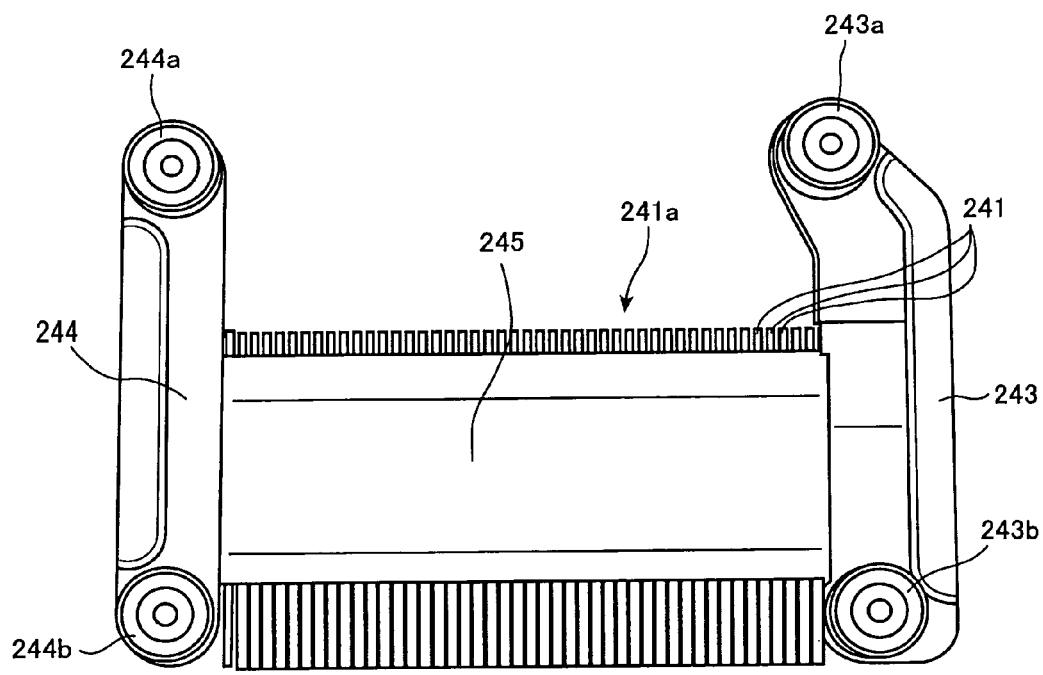
FIG. 13 is a plane view of the heat radiating member.

FIG. 12 shows a positional relationship between the fan 250 and the heat radiating member 240 with the metal plate 252 removed therefrom.

Two kinds of LSIs, that is, what is called CPU and chipset are disposed under the heat radiating member 240. The heat radiating member 240 serves for radiating heat generated by the two LSIs, which will be described later in detail.

Air blown from the fan 250 enters the air inlet portion 241a to reach the heat radiating fins 241 and then is warmed up while passing between the heat radiating fins 241 by absorbing heat therefrom and exits from the air outlets 207 (also see FIG. 5) formed in the flank of the back of the main unit 20.

(Structure of Heat Radiating Member)

The heat radiating member 240 includes a flat base section (hereafter referred to as "a base plate") 242, the multiple pieces of radiating fins 241 that are fixed to and stand on the base plate 242 and a pair of arms (hereafter referred to as "arm plates") 243, 244 that extend horizontally at both ends of the base plate 242. The arm plates 243, 244 include fasteners 243a, 243b, and 244a, 244b respectively disposed at the front and the back thereof for fastening the heat radiating member 240 with screws. Additionally, the heat radiating member 240 has a fixed section (hereafter referred to as "a fixed plate") 245 that stands at both ends of the heat radiating fins 241 and links the both ends by extending over the heat radiating fins 241 like a bridge. The pair of arm plates 243, 244 are formed by extending the fixed plate 245.

The manufacturing process of the heat radiating member 240 is as follows: solder is applied to the bottom of each of the heat radiating fins 241 to place them on the top face of the base plate 242; then, solder is applied to the top of each of the heat radiating fins 241 to attach the heat radiating fins 241 and the base plate 242 to the fixed plate 245, which are subjected to solder-joint with a furnace to complete manufacturing.

Incidentally, the fasteners 243a, 234b, and 244a, 244b respectively have a structure of a fixed pedestal with a spring incorporated therein. Thus, the heat radiating member 240 is pressed against heat radiating components by means of springs when fastened with screws. Such a structure is well known art and thus further explanation is omitted.

Figure 15:
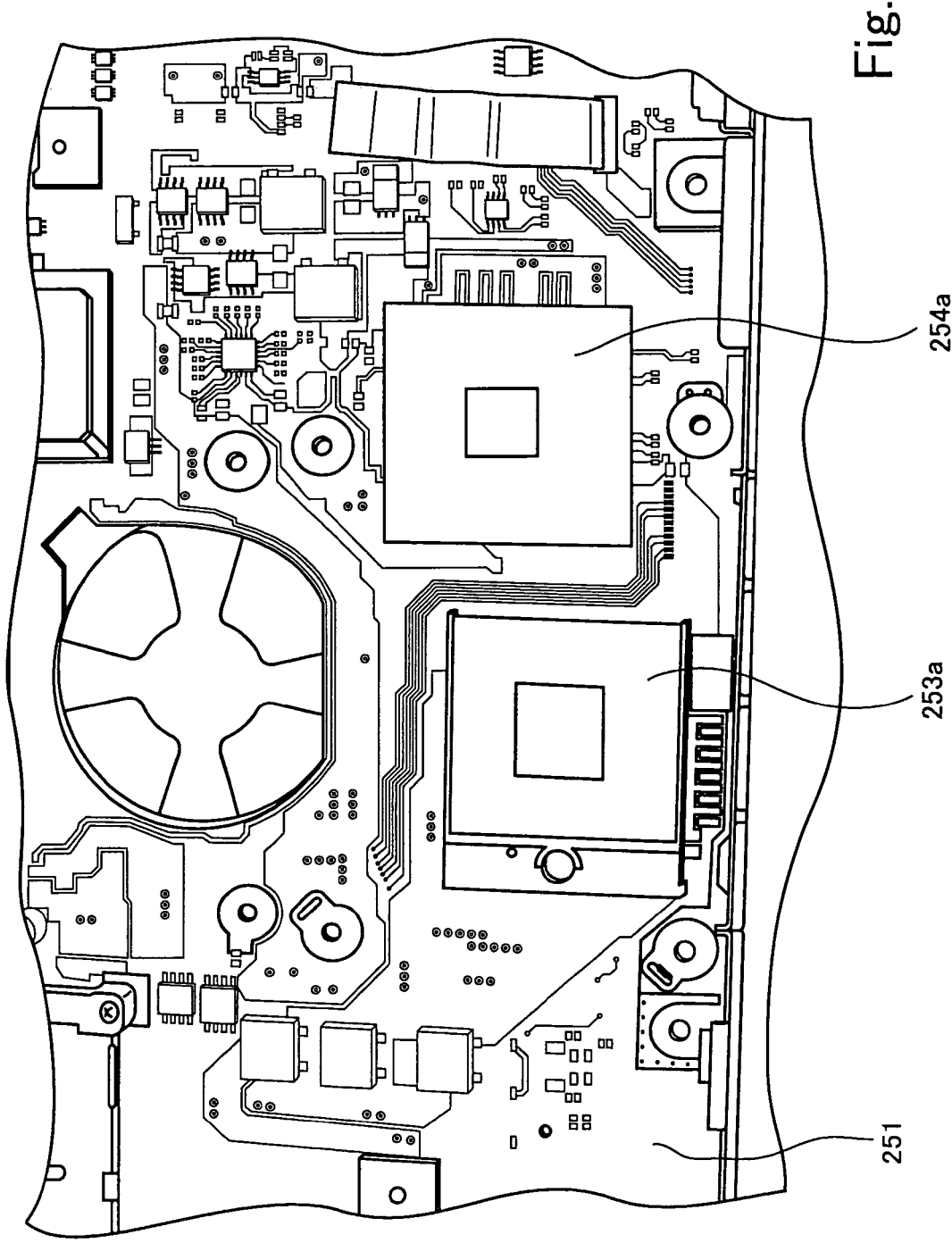
FIG. 15 shows heat generating components on a main circuit board.

FIG. 15 shows heat generating components on the main circuit board 251.

Figure 14:
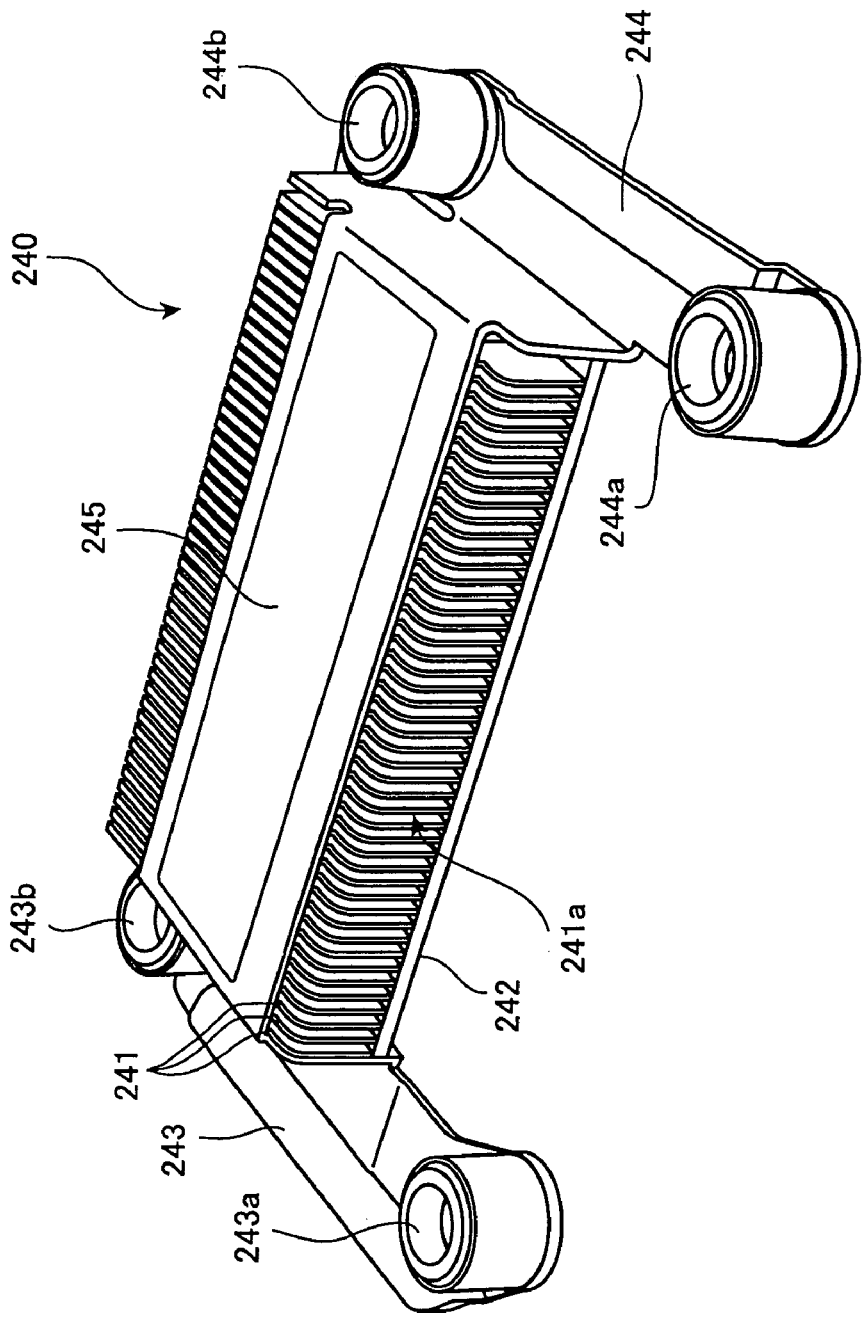
FIG. 14 is a perspective view of the heat radiating member.

FIG. 15 illustrates CPU 253a and chipset 254a disposed near the CPU 253a that are heat generating components to be cooled by the heat radiating member 240 shown in FIG. 14. As the CPU 253a generates larger amount of heat than the chipset 254a, it is placed so as to be efficiently cooled by the heat radiating member 240. More particularly, the CPU 253a is disposed under the base plate 242, so that heat generated by the CPU 253a is conducted via the base plate 242 to the heat radiating fins 241 from the bottom thereof. On the other hand, the chipset 254a is disposed under one of arm plates 243, 244 (in this case the arm plate 243), so that heat generated by the chipset 254a is conducted via the fixed plate 245 to the heat radiating fins 241 from the top thereof.

Figure 16:
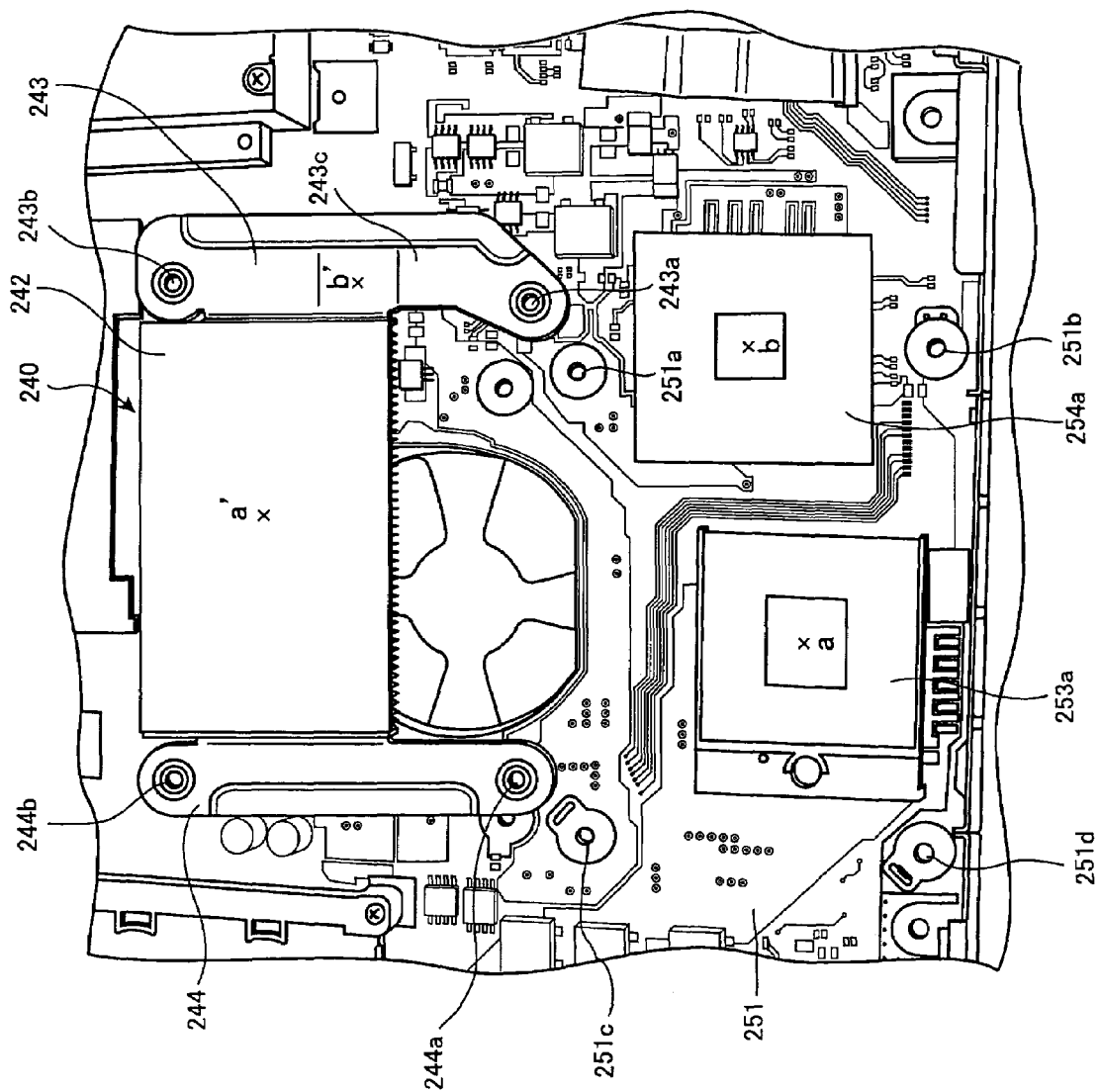
FIG. 16 illustrates two heat generating components and a bottom face of the heat radiating member that contacts the heat generating components.

FIG. 16 illustrates two heat generating components, that is, the CPU 253a and the chipset 254a, and a bottom face of the heat radiating member 240 that contacts the heat generating components.

The heat radiating member 240 is arranged on the CPU 253a and the chipset 254a so as to be in contact with them via thermal grease. When the heat radiating member 240 is attached to the CPU 253a and the chipset 254a by screwing the fasteners 243a, 243b and 244a, 244b of the arm plates 243, 244 in the four respective holes 251a, 251b and 251c, 251d formed in the main circuit board 251, a substantial center "a" of the CPU 253a contacts a substantial center "a'" of the base plate 242 of the heat radiating member 240, while a substantial center "b" of the chipset 254a contacts a substantial center "b'" having a downward projection of the arm plate 243. The downward projection of the arm plate 243 will be described later in detail.

Figure 17:
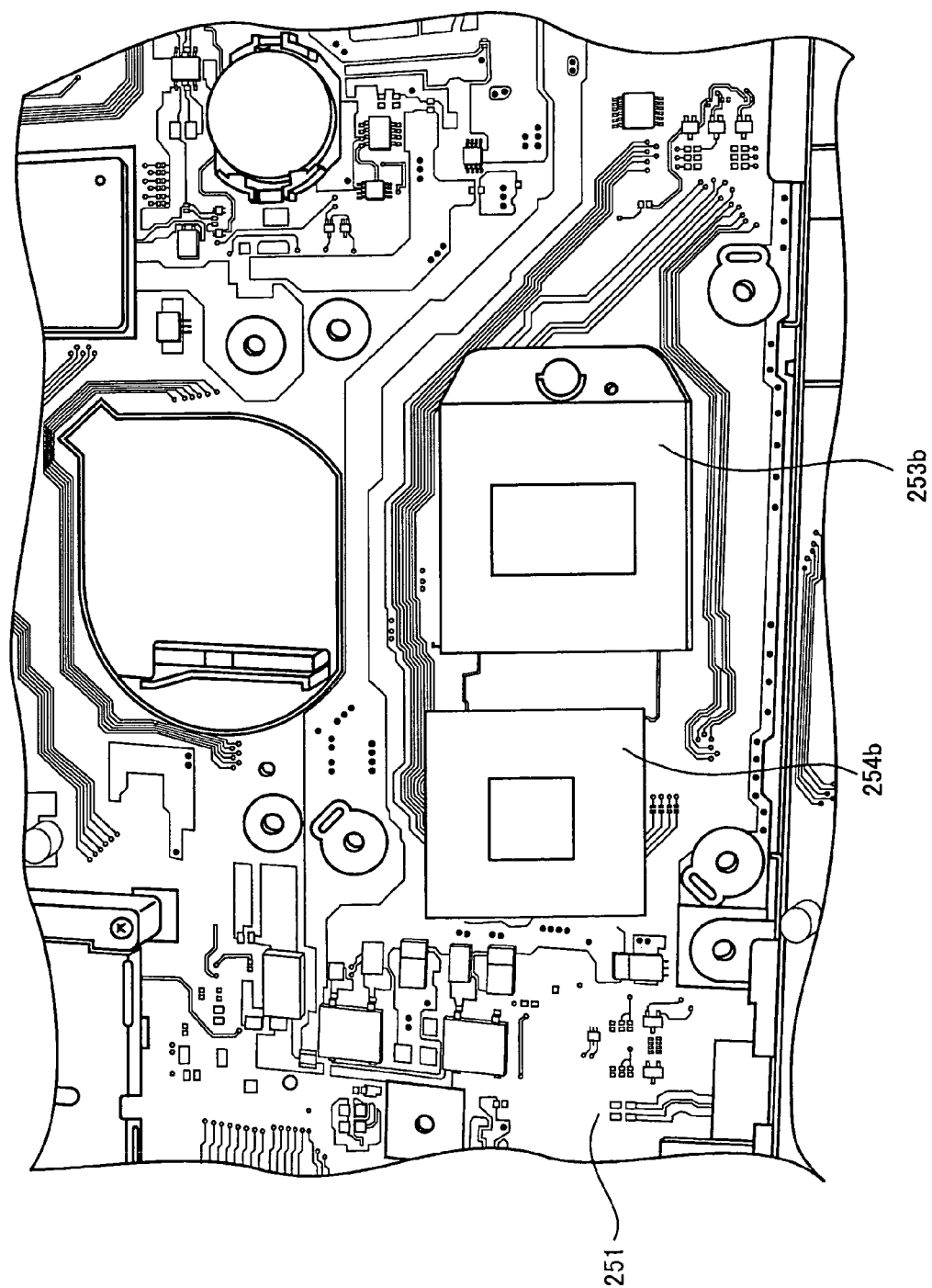
FIG. 17 shows positional relation between a CPU and a chipset different from that shown in FIGS. 15 and 16.

FIG. 17 show positional relation between a CPU and a chipset different from that shown in FIGS. 15 and 16

The notebook PC 10 according to the embodiment (see FIG. 1) includes two kinds of notebook PCs mounted with two kinds of CPUs and chipsets of different manufacturers. FIGS. 15 and 16 show positional relation between CPU 253b and chipset 254b of a first kind of the notebook PCs while FIG. 17 shows that of a second kind of the notebook PC.

The difference of positional relation between the CPU 253b and the chipset 254b between FIGS. 15, 16 and FIG. 17 lies in that the position of the CPU 253a is roughly replaced with the chipset 254a.

Figure 18:
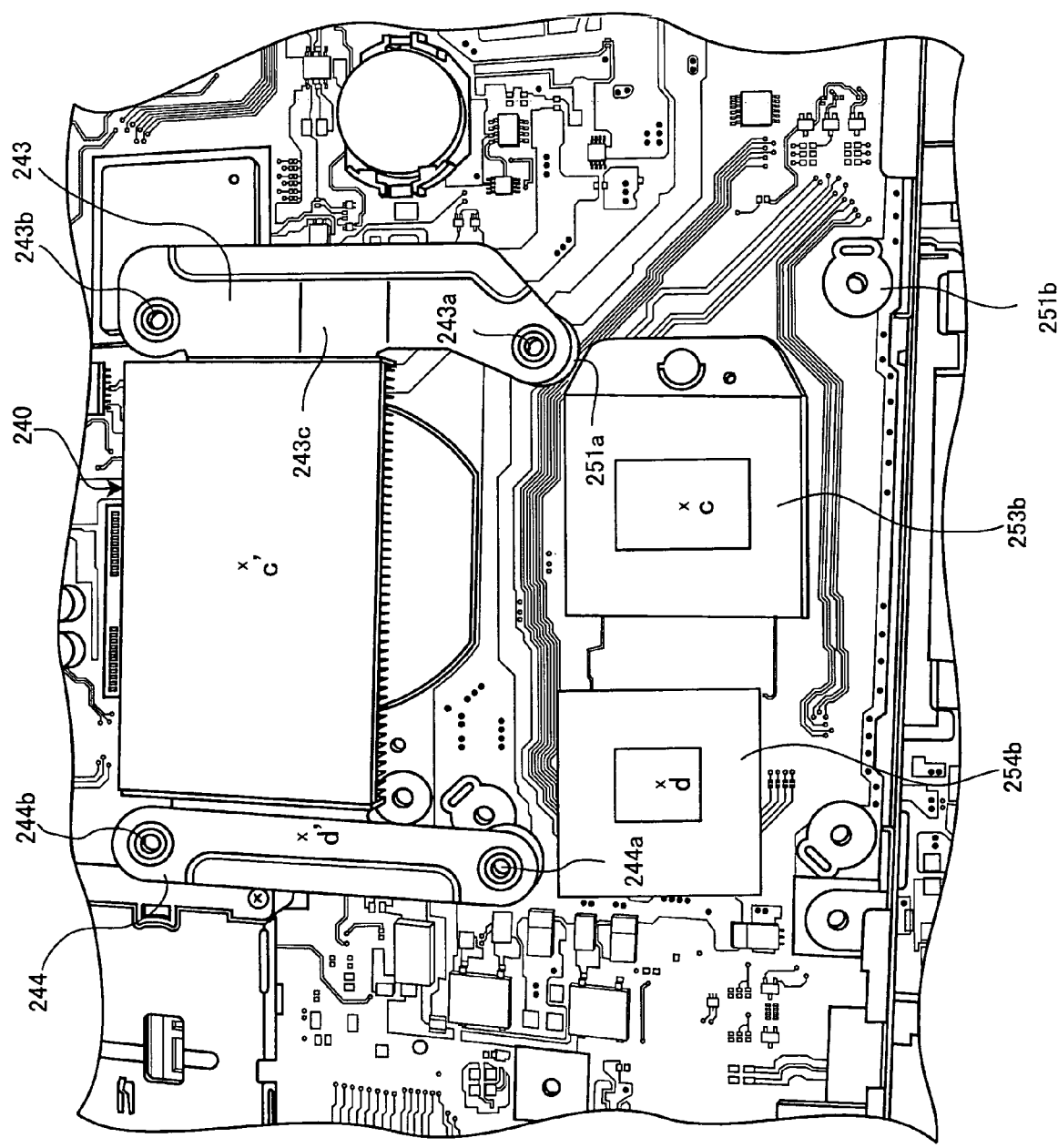
FIG. 18 illustrates two heat generating components, that is, the CPU and the chipset, and a bottom face of the heat radiating member that contacts the heat generating components.

FIG. 18 illustrates two heat generating components, that is, the CPU 253b and the chipset 254b, and a bottom face of the heat radiating member that contacts the heat generating components.

Similarly to the notebook PC 10 shown in FIG. 16, the heat radiating member 240 is arranged on the CPU 253b and the chipset 254b so as to be in contact with them via thermal grease. When the heat radiating member 240 is attached to the CPU 253b and the chipset 254b by screwing the fasteners 243a, 243b and 244a, 244b of the arm plates 243, 244 in the four respective holes 251a, 251b and 251c, 251d formed in the main circuit board 251, a substantial center "c" of the CPU 253b contacts a substantial center "c'" of the base plate 242 of the heat radiating member 240, while a substantial center "d" of the chipset 254b contacts a substantial center "c'" of the arm plate 244.

The height of the chipset 254a with reference to that of the CPU 253a, in the first kind of the notebook PC shown in FIG. 16, differs from the height of the chipset 254b with reference to that of the CPU 253b in the second kind of the notebook PC shown in FIG. 18. That is why the arm plate 243 constituting the heat radiating member 240 has the downward projection 243c to offset difference in height between the chipsets 254a and 254b so that the heat radiating member 240 can contact both the chipsets 254a and 254b.

According to the embodiment, the heat radiating member 240 has such a structure that difference in height between the CPU 253a and 253b is offset by the amount of contraction and extension of the springs of the fasteners 243a, 243b and 244a,

244b, while difference in height between the chipsets 254a and 254b is offset by the shape of the arm plate 243.

Such a structure enables the heat radiating member 240 of the same shape to be used for the two kinds of notebook PCs, by aligning the holes 251a, 251b and 251c, 251d formed in the main circuit board 251 of the notebook PC 10 with the fasteners 243a, 243b and 244a, 244b of the arm plates 243, 244 of the heat radiating member 240.

(Structure of Hard Disc Drive Unit Loading Opening Portion)

Figure 19:
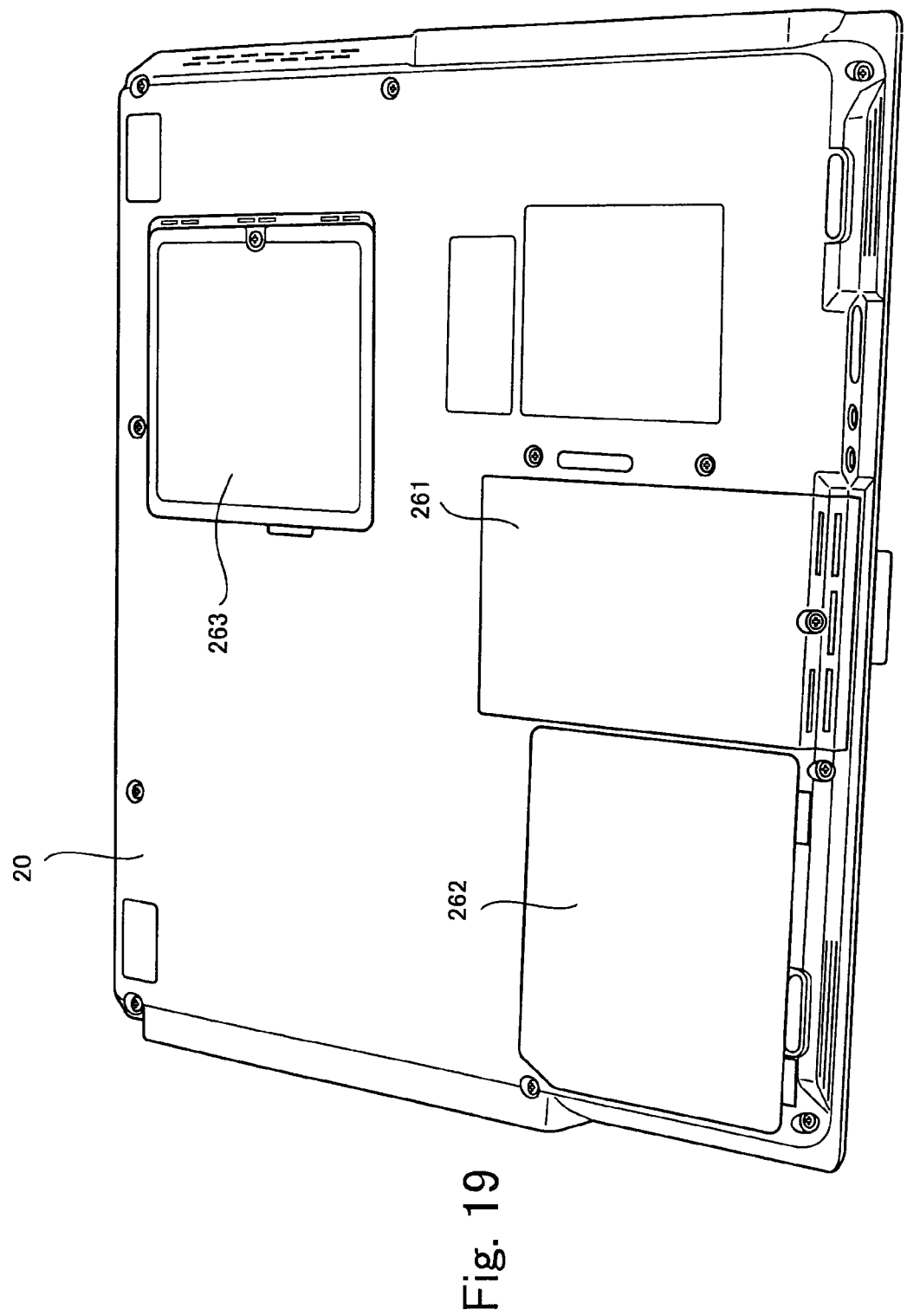
FIG. 19 is a perspective view of a bottom face of the main unit of the notebook PC.

FIG. 19 is a perspective view of a bottom face of the main unit 20 of the notebook PC 10.

FIG. 19 shows a cover member 261 for closing the hard disc drive unit loading opening, a cover member 262 for closing a battery loading opening and a cover member 263 for closing a memory card loading opening.

Figure 20:
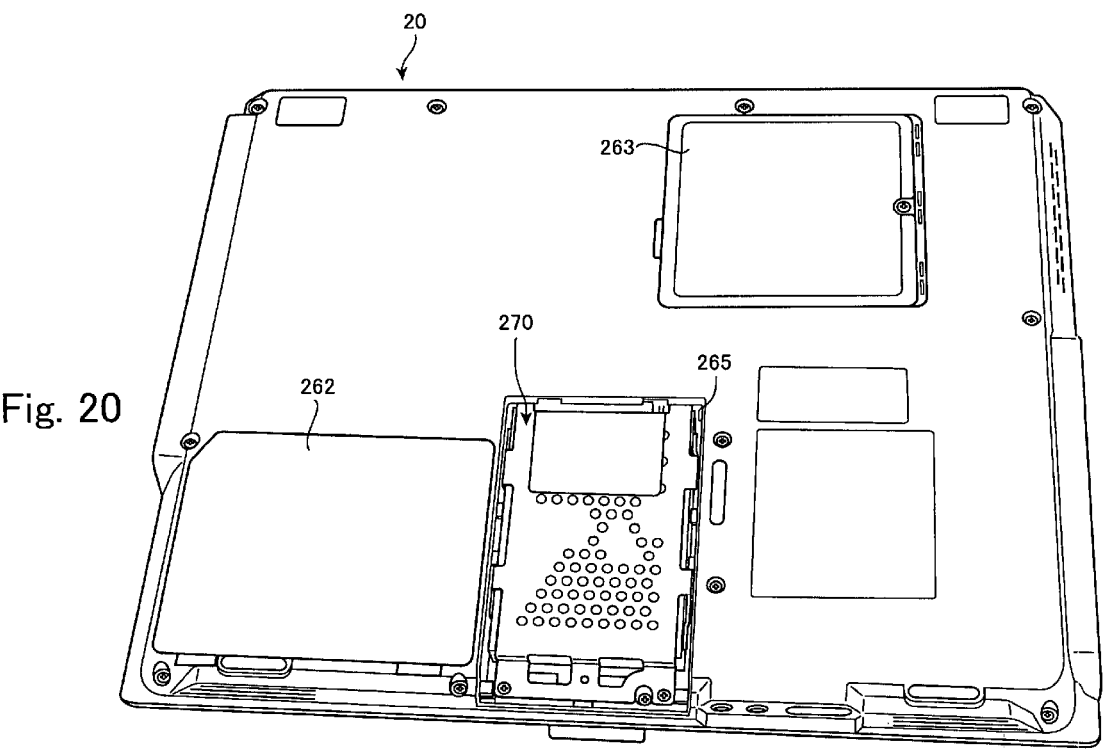
FIG. 20 shows the bottom face of the main unit of the notebook PC shown in FIG. 19, with the cover member for closing a hard disc drive unit loading opening removed therefrom.

FIG. 20 shows the bottom face of the main unit 20 of the notebook PC shown in FIG. 19, with the cover member 261 for closing the hard disc drive unit loading opening removed therefrom.

As shown in FIG. 20, an opening 265 for housing a hard disc drive unit 270 is formed in the bottom face of the main unit 20 and the hard disc drive unit 270 is housed therein.

Figure 21:
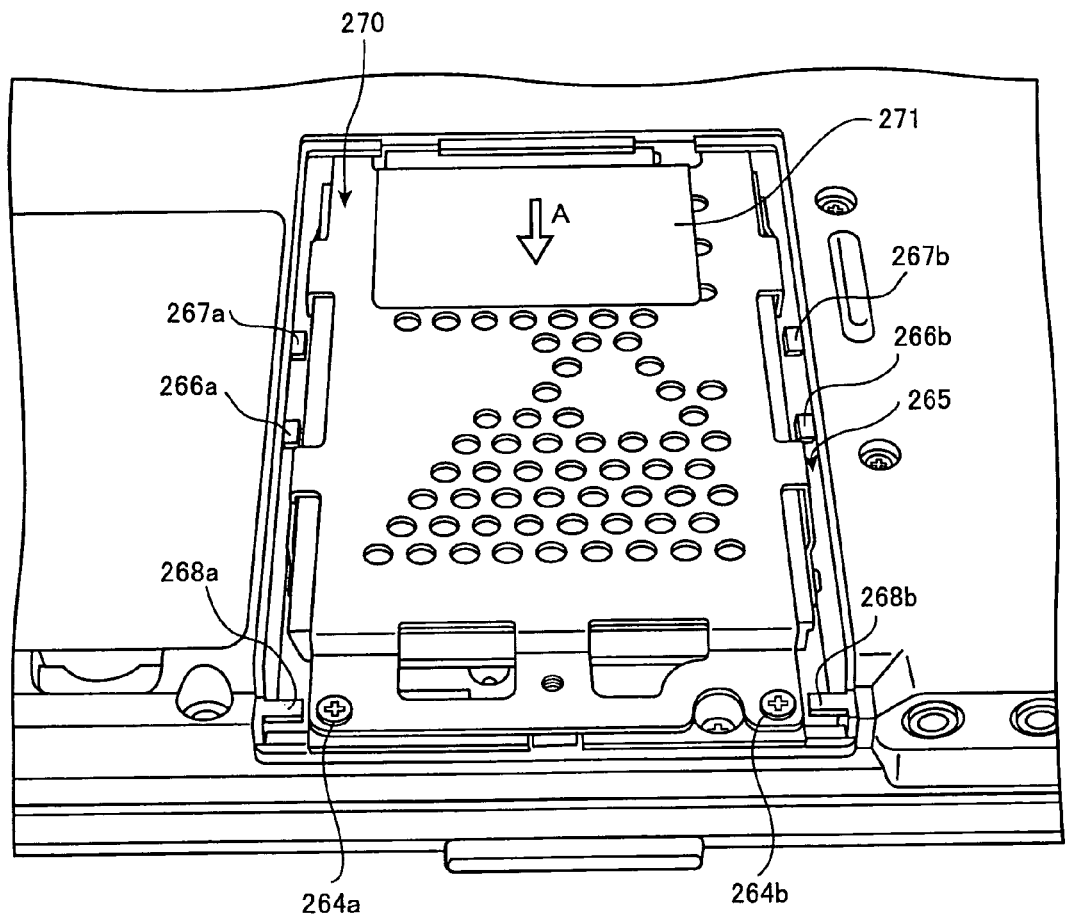
FIG. 21 is an enlarged view of an opening for accommodating the hard disk drive unit and the hard disc drive unit housed therein.

FIG. 21 is an enlarged view of the opening 265 and the hard disc drive unit 270 housed therein.

In order to remove the hard disc drive unit 270 from the opening 275, two screws 264a and 264b are first to be disengaged to pull a sheet 271 in the direction indicated by the arrow A, thereby disengaging a unit side connector 273 (see FIG. 22), which will be described later. Then, the hard disc drive unit 270 is ready to be removed from the opening 275. Alternatively, in order to house the hard disc drive unit 270 in the opening 275, the hard disc drive unit 270 is first to be placed on a position little displaced from the position indicated by FIG. 21 toward the direction indicated by the arrow A. Then, pressing the hard disc drive unit 270 in the direction opposite the direction indicated by the arrow A causes the unit side connector 273 to be engaged and then, by screwing the hard disc drive unit 270 with the two screws 264a and 264b, the hard disc drive unit 270 is appropriately housed in the opening 265.

It should be noted that the opening 265 has a pair of projections 266a and 266b projecting inside and disposed at both sides thereof. The projections 266a and 266b interfere with the hard disc drive unit 270, if the unit side connector 273 is to be engaged while the back end (opposite the unit side connector 273) of the hard disc drive unit 270 is lifted obliquely or the whole of the hard disc drive unit 270 is lifted from the level of the opening 265. Thus, the projections 266a and 266b prevent wrong connection of the unit side connector 273 and failures such as bent back connector pins. Additionally, the opening 265 has projections 267a, 267b, and 268a, 268b disposed at both sides thereof that serve for engaging the cover member 261 (see FIGS. 19 and 31) for the opening 265.

Figure 22:
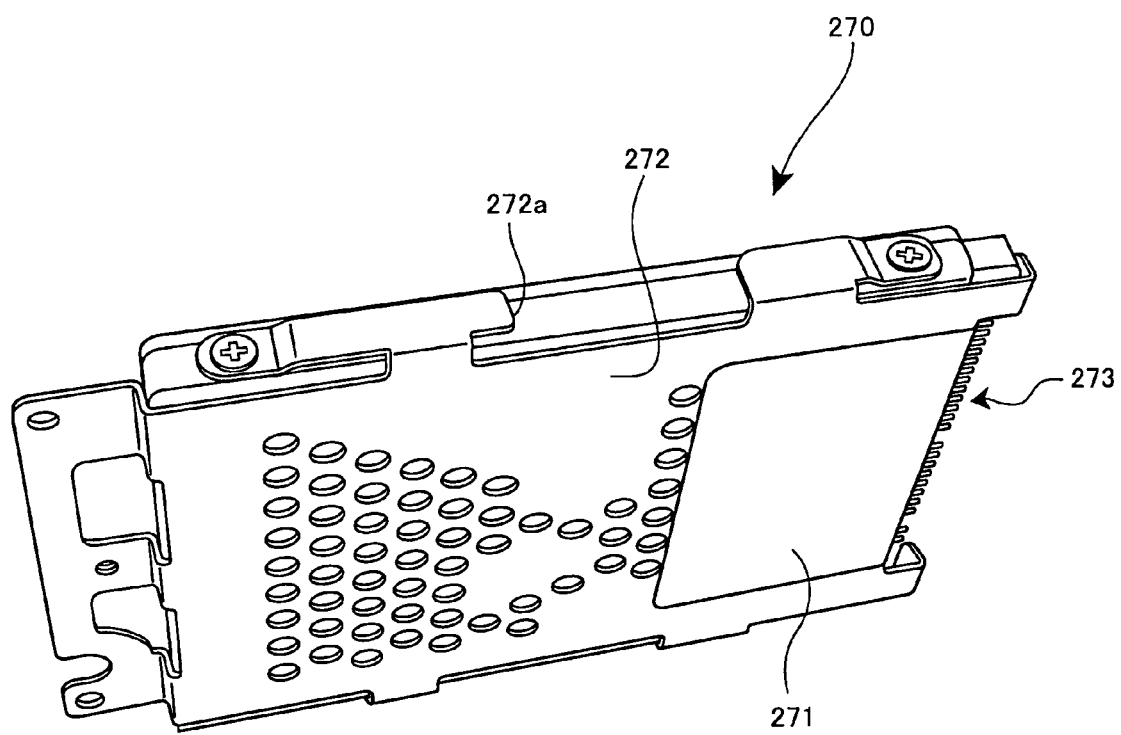
FIG. 22 is a view of the hard disk drive unit as viewed at a certain angle.
Figure 23:
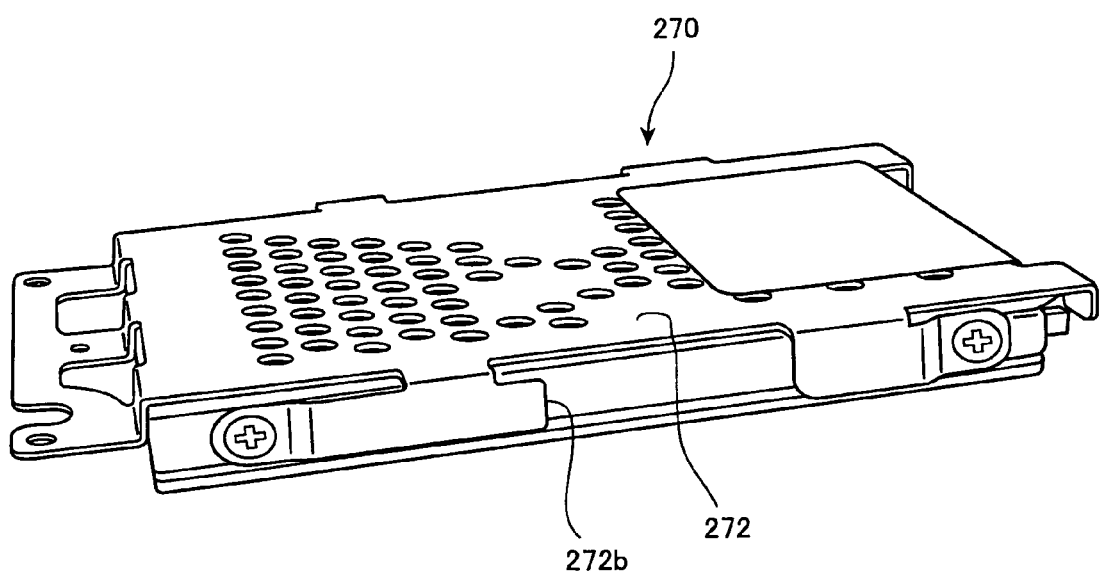
FIG. 23 is a view of the hard disk drive unit as viewed at a different angle.
Figure 24:
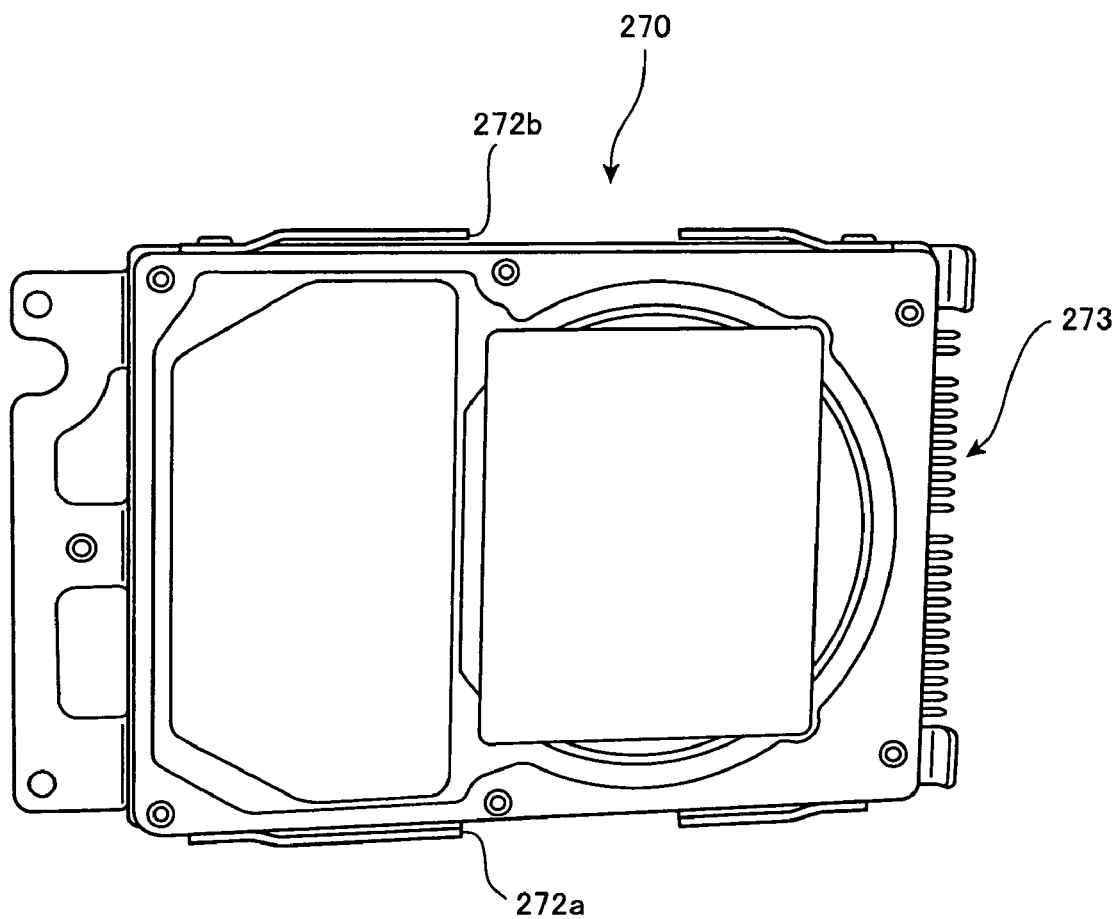
FIG. 24 is a view of the hard disk drive unit as viewed at another different certain angle.
Figure 25:
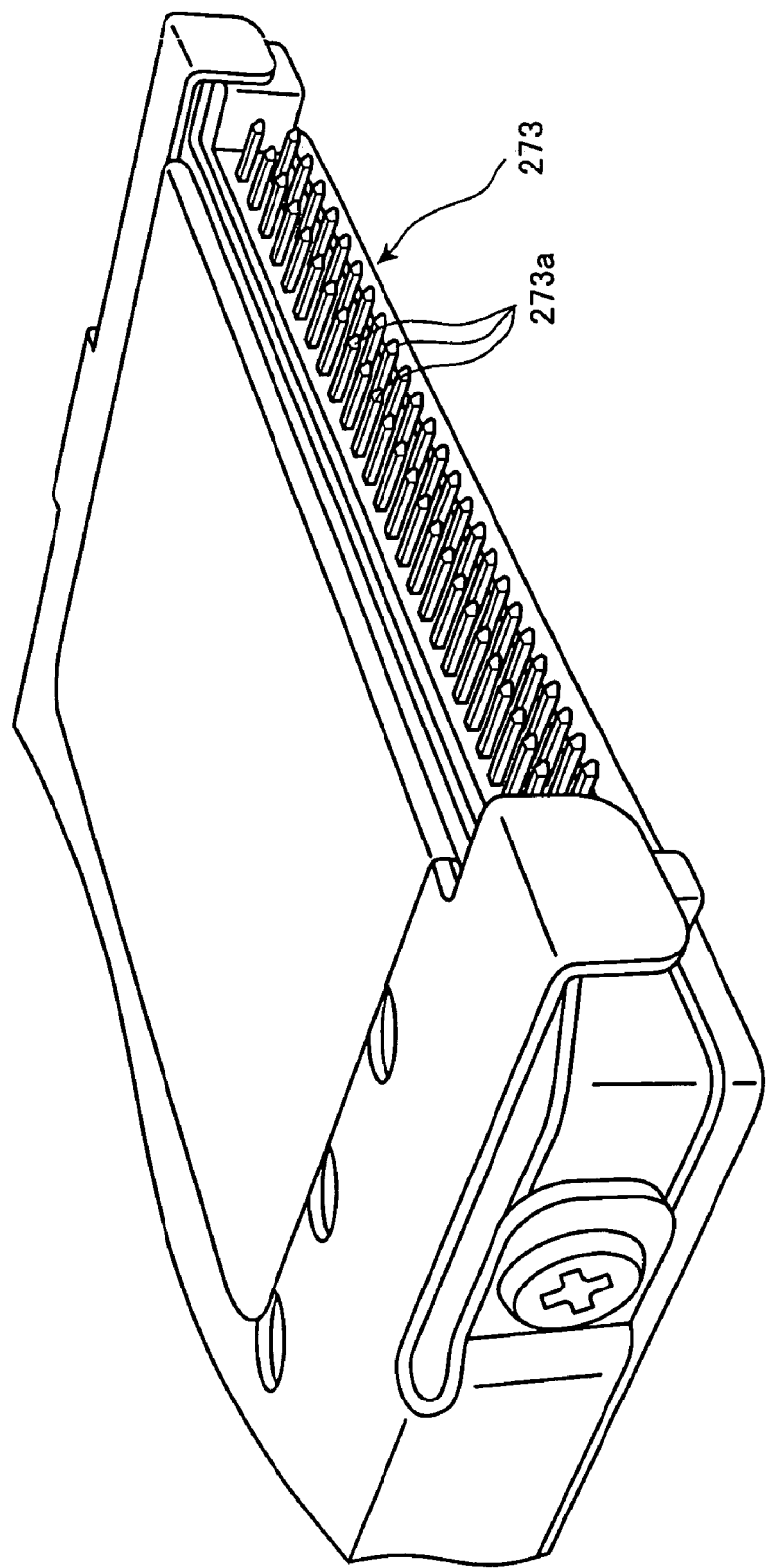
FIG. 25 is a perspective view of a unit side connector provided in the hard disc drive unit.

FIGS. 22 through 24 illustrate the hard disc drive unit 270 as viewed from different angles from that in FIG. 21. FIG. 25 is a perspective view of the unit side connector 273 provided in the hard disc drive unit 270.

As shown in FIGS. 22 through 24, the hard disc drive unit 270 is provided with a metal frame 272 that is fastened to the hard disc drive unit 270 with screws in the side portions thereof that are formed by extending the metal frame 272 and bending it at the both edges. The metal frame 272 serves for maintaining strength of the hard disc drive unit 270 as well as shielding electromagnetic force of its internal hard disc and magnetic disc. Multiple holes formed in the metal frame 272 are intended for reduction in weight while maintaining strength and shielding performance.

Additionally, the metal frame 272 also serves for preventing wrong engagement of the unit side connector 273. When the unit side connector 273 is to be engaged while the hard disc drive unit 270 is in undesired postures, for example, lifted obliquely as described above, interfering sections 272a and 272b of the metal frame 272 interfere with the projections 266a and 266b of the opening 265.

Further, the hard disc drive unit 270 is provided with the unit side connector 273 at the front end thereof. As shown in FIG. 25, the unit side connector 273 has multiple connection pins 273a aligned in two rows.

Figure 26:
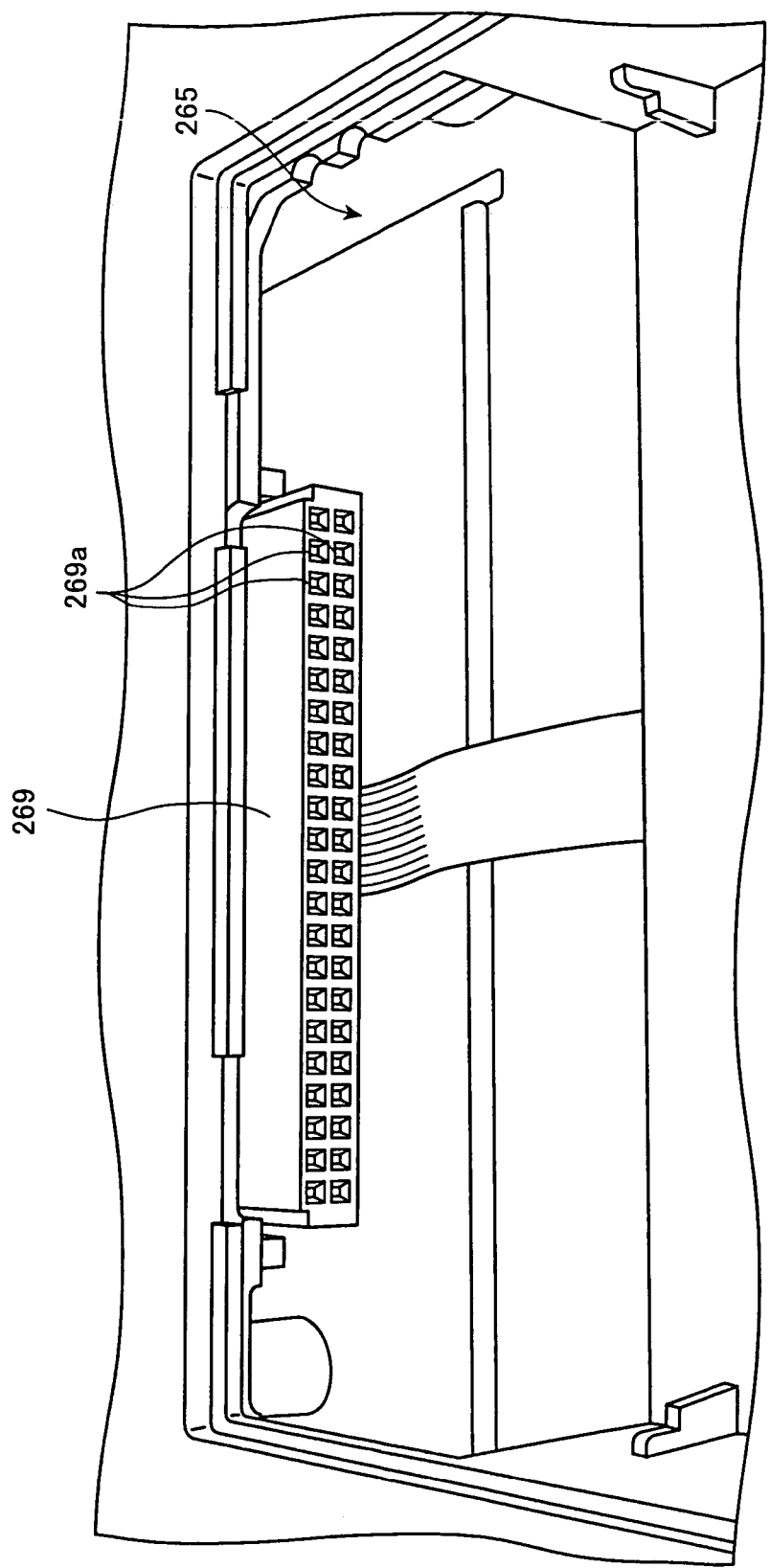
FIG. 26 shows an apparatus side connector that is to be connected with the unit side connector provided in the hard disc drive unit.

FIG. 26 shows an apparatus side connector 269 that is to be connected with the unit side connector 273 provided in the hard disc drive unit 270.

The apparatus side connector 269 has multiple pin insertion holes 269a aligned in two rows to receive the corresponding connection pins 273a aligned in two rows of the unit side connector 273 provided in the hard disc drive unit 270.

Figure 27:
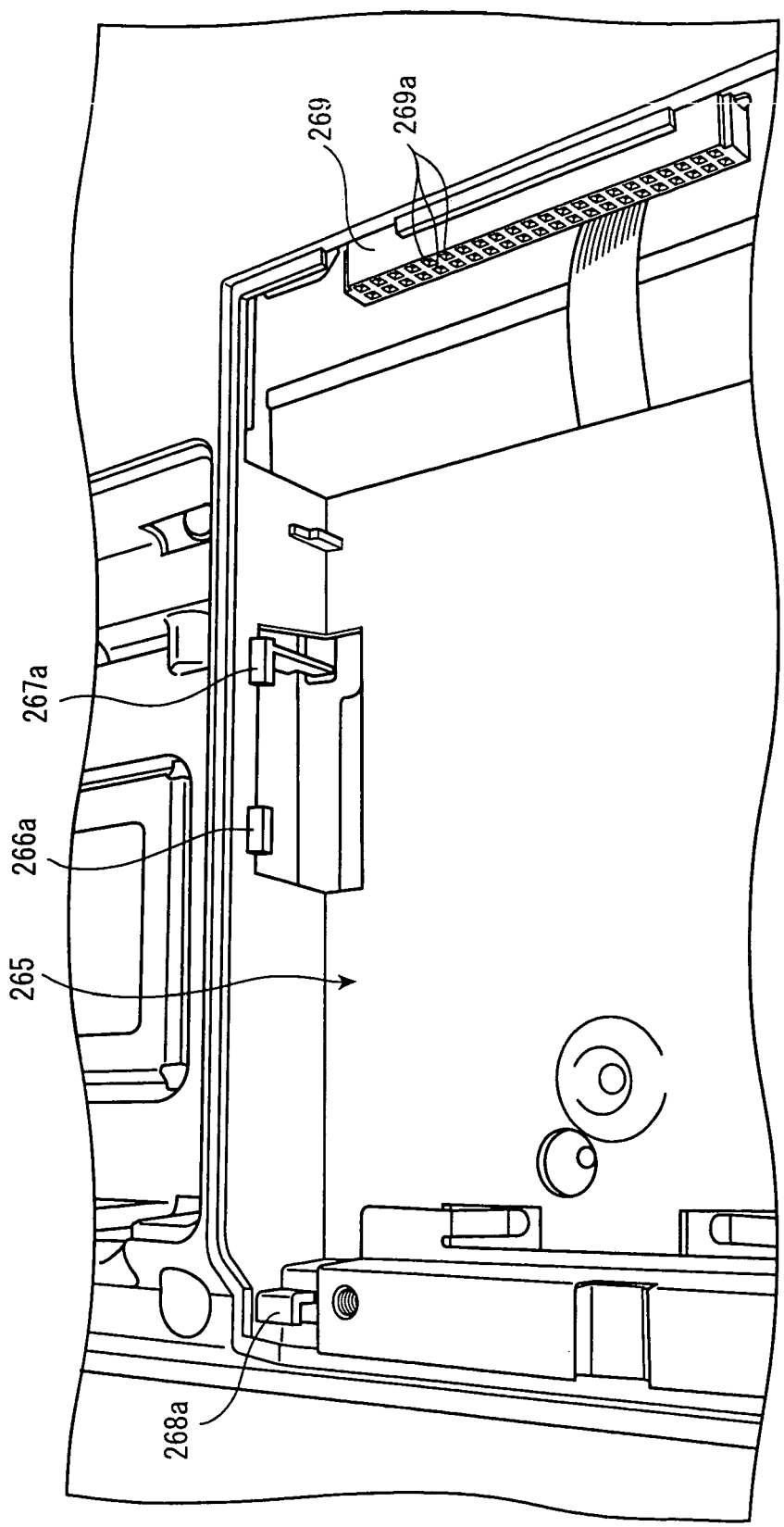
FIG. 27 is a perspective view of one side of the opening in which the hard disc drive unit is housed.

FIG. 27 is a perspective view of one side of the opening 265 in which the hard disc drive unit 270 is housed.

As shown in FIG. 27, the side of the opening 265 is configured such that the metal frame 272 (see FIG. 22) goes under the projection 266a disposed at the side of the opening 265 when the hard disc drive 270 is housed in the opening 265. The same holds true for the projection 266b at the other side of the opening 265.

Figure 28:
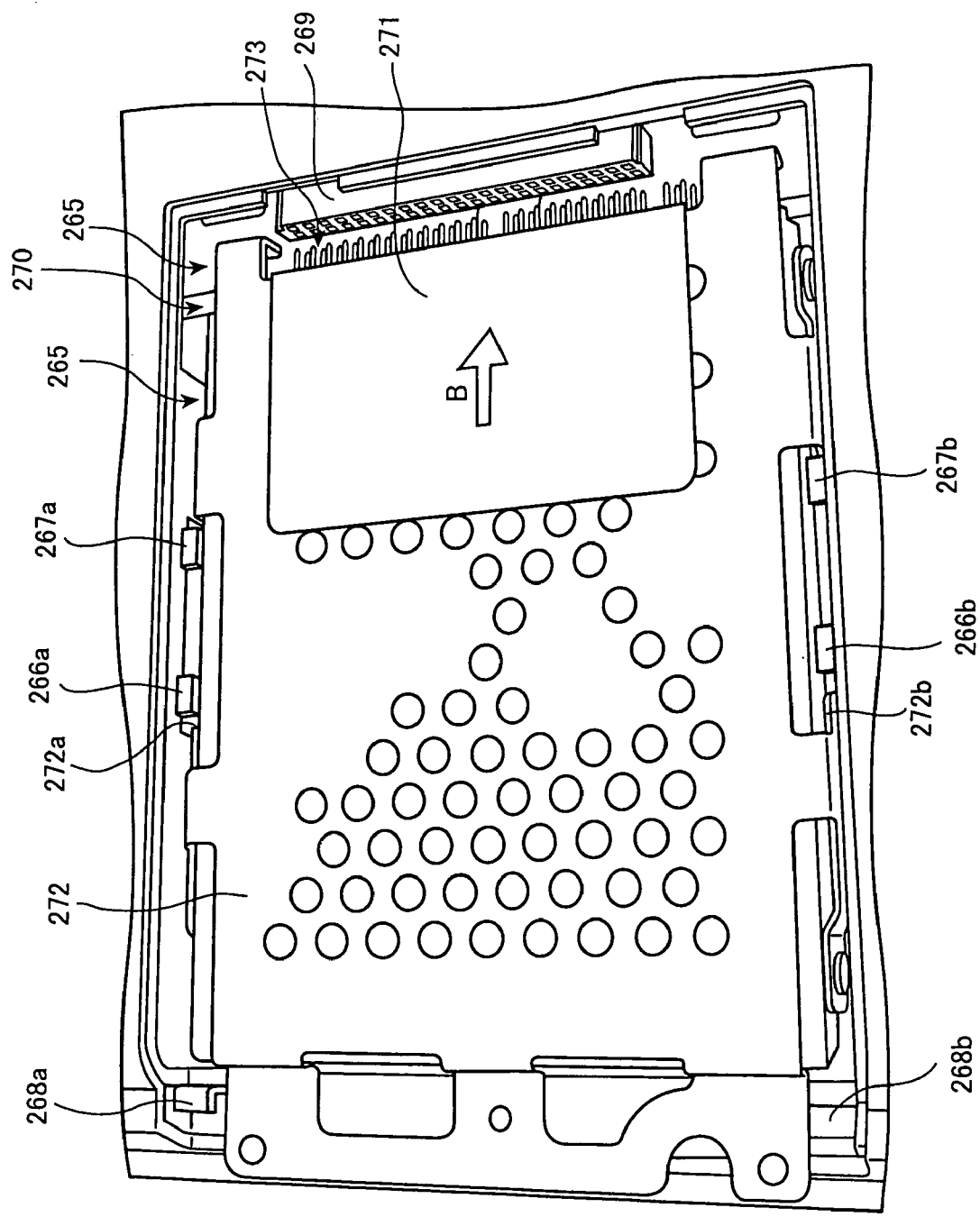
FIG. 28 show the state in which the hard disc drive is about to be housed by being placed in the correct position in the opening of the hard disc drive unit.
Figure 29:
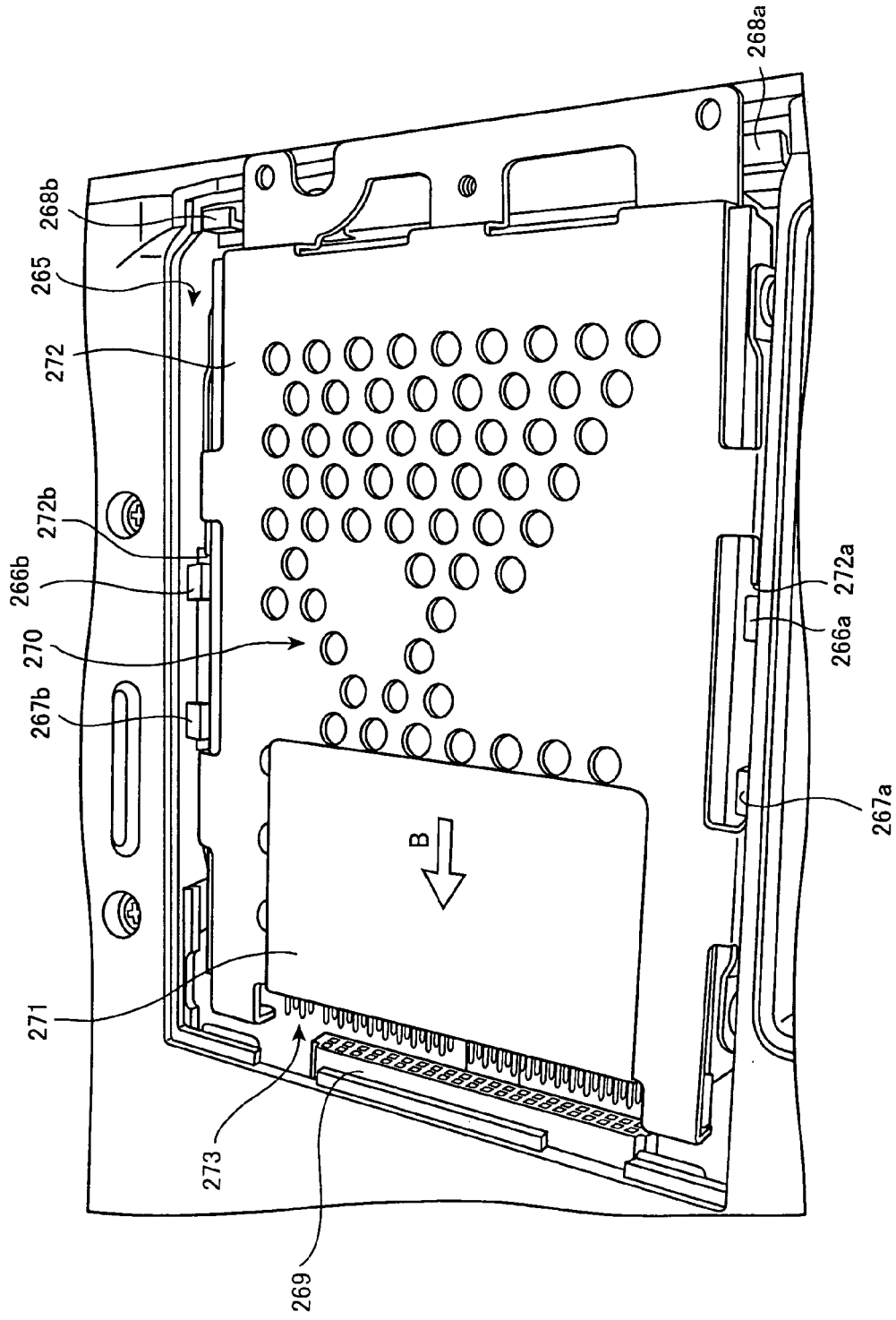
FIG. 29 also show the state in which the hard disc drive is about to be housed by being placed in the correct position in the opening of the hard disc drive unit.

FIGS. 28 and 29 show the state in which the hard disc drive 270 is about to be housed in the correct position in the opening 265.

The hard disc drive unit 270 is placed in the position indicated in FIGS. 28 and 29, and pressed in the direction indicated by the arrow B, thereby making the unit side connector 273 to be engaged with the apparatus side connector 269. As the hard disc drive unit 270 is placed in the correct position, the interfering sections 272a, 272b of the metal frame 272 of the hard disc drive unit 270 do not interfere with the projections 266a and 266b provided in the opening 265, so that the hard disc drive unit 270 goes under the 266a and 266b.

Figure 30:
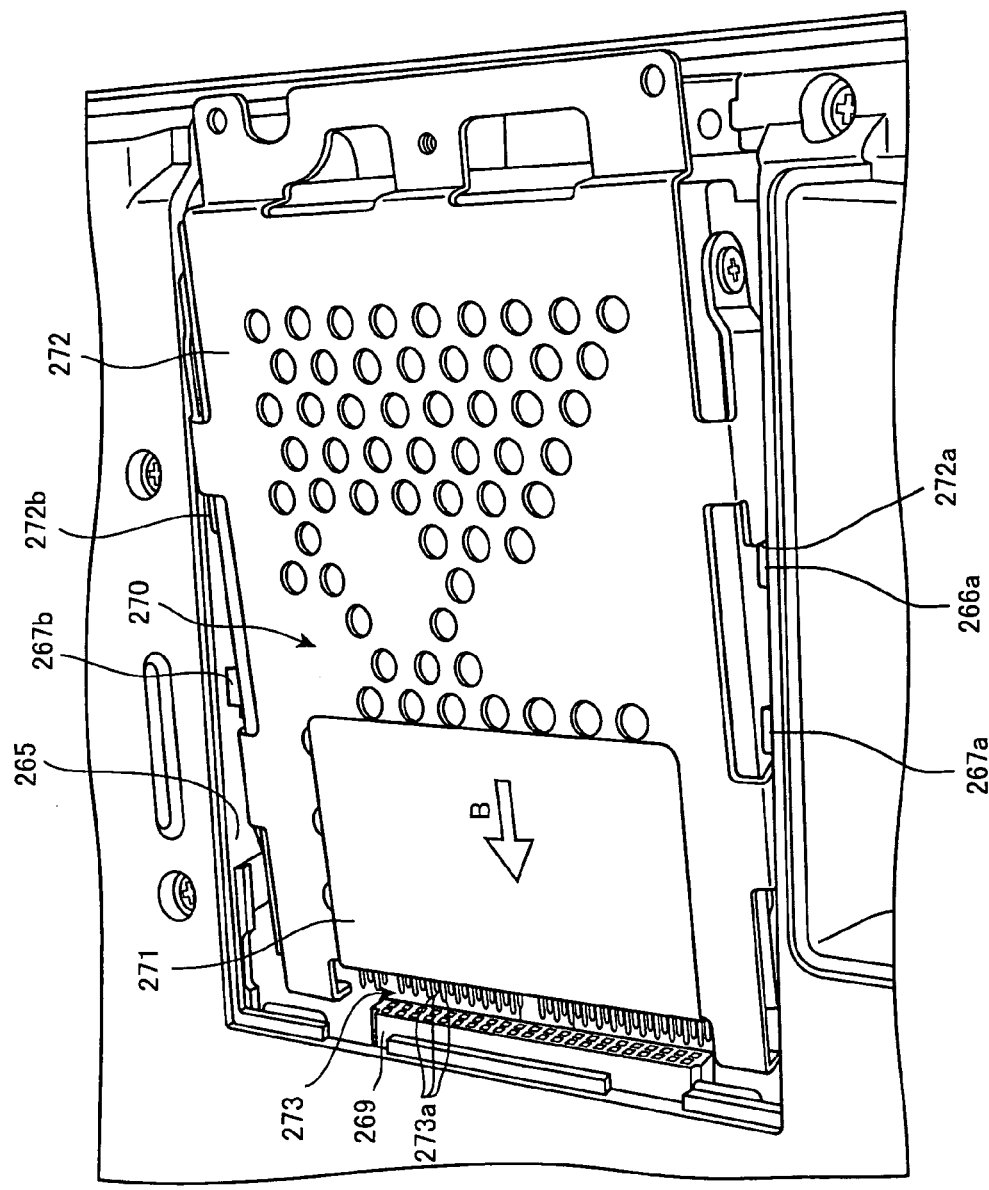
FIG. 30 shows the state in which the hard disc drive unit with its back obliquely lifted is placed in the opening.

FIG. 30 shows the state in which the hard disc drive unit 270 with its back obliquely lifted is placed in the opening 265.

If the hard disc drive unit 270 is pushed in the direction indicated by the arrow B while keeping the posture shown in FIG. 30, the interfering section 272a, 272b interfere with the projections 266a, 266b, resulting in failure of engagement between the unit side connector 273 and the apparatus side connector 269. Thus, it is possible to prevent failures such as bent-back of the connection pins 273a due to forced engagement.

FIG. 30 shows the case in which the back of the hard disc drive unit 270 is obliquely lifted. However, the same holds true for the case in which the whole of the hard disc drive unit 270 is lifted from the opening 265 in a horizontal posture. Further, there may be a case in which the connection pins 273a aligned in the lower row of the unit side connector 273 are inserted in the insertion holes 269a aligned in the upper row of the apparatus side connector 269. In such a case, however, the interfering section 272a, 272b are to be positioned over the projections 266a, 266b, and thus the hard disc drive unit 270 cannot be housed in the opening 265 nor the cover member 261 (see FIG. 19) for closing the opening 265 can be attached. Accordingly, it is easy to grasp that the hard disc drive unit 270 is not properly housed in the opening 265, making it possible to prevent such a wrong engagement. Additionally, there may be a case that the hard disc drive unit 270 is lifted so obliquely that the interfering section 272a, 272b can go over the projections 266a, 266b, and the connection pins 273a aligned in the lower row of the unit side connector 273 can be forcibly inserted in the insertion holes 269a aligned in the upper row of the apparatus side connector 269. In such a case, however, the interfering section 272a, 272b are to be positioned over the projections 266a, 266b, and thus the hard disc drive unit 270 cannot be housed in the opening 265 nor the cover member 261 (see FIG. 19) for closing the opening 265 can be attached. Accordingly, it is easy to grasp that the hard disc drive unit 270 is not properly housed in the opening 265.

When the hard disc drive unit 270 is housed in the opening 265 in the correct position, the interfering section 272a, 272b are positioned under the projections 266a, 266b. Accordingly, when the hard disc drive unit 270 is removed from the opening 265, it is not possible to lift the back of the hard disc drive unit 270 before releasing the engagement between the connectors 269 and 273. Thus, it is possible to secure that the unit side connector 273 is properly pulled from the apparatus side connector 269.

Figure 31:
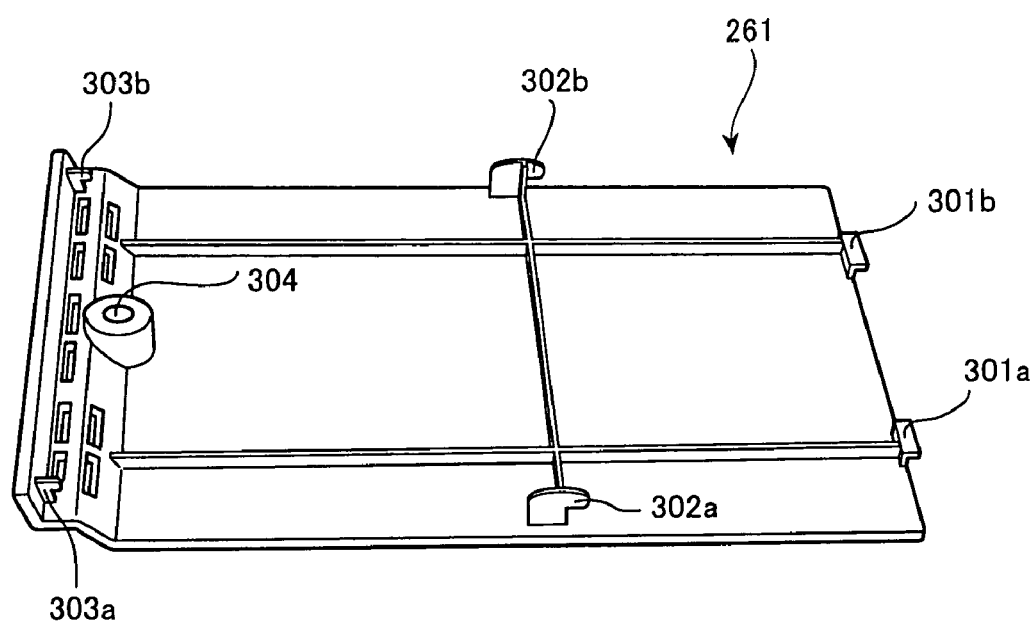
FIG. 31 shows a back face of the cover member for closing the opening in which the hard disc drive unit is housed.

FIG. 31 shows a back face of the cover member 261 for closing the opening 265 in which the hard disc drive unit 270 is housed.

On the back face of the cover member 261, disposed are two projections 301a, 301b projecting toward the depth of the opening 265 (see FIG. 21), two projecting claws 302a and 302b engaging the two projections 267a and 267b that are disposed at both sides of the opening 265 and projecting inside thereof, and two engaging claws 303a, 303b engaging the two projections 268a, 268b that project from the back end of the opening 265. Additionally, the cover member 261 has a hole 304 formed at the back side thereof. The cover member 261 closes the opening 265, as shown in FIG. 19, by engaging the two projections 301a, 301b, the projecting claws 302a, 302b, and the engaging claws 303a, 303b of the cover member 261 with the corresponding parts of the opening 265 and by screwing in the hole 304.

(Structure of PC Card Slot)

Figure 32:
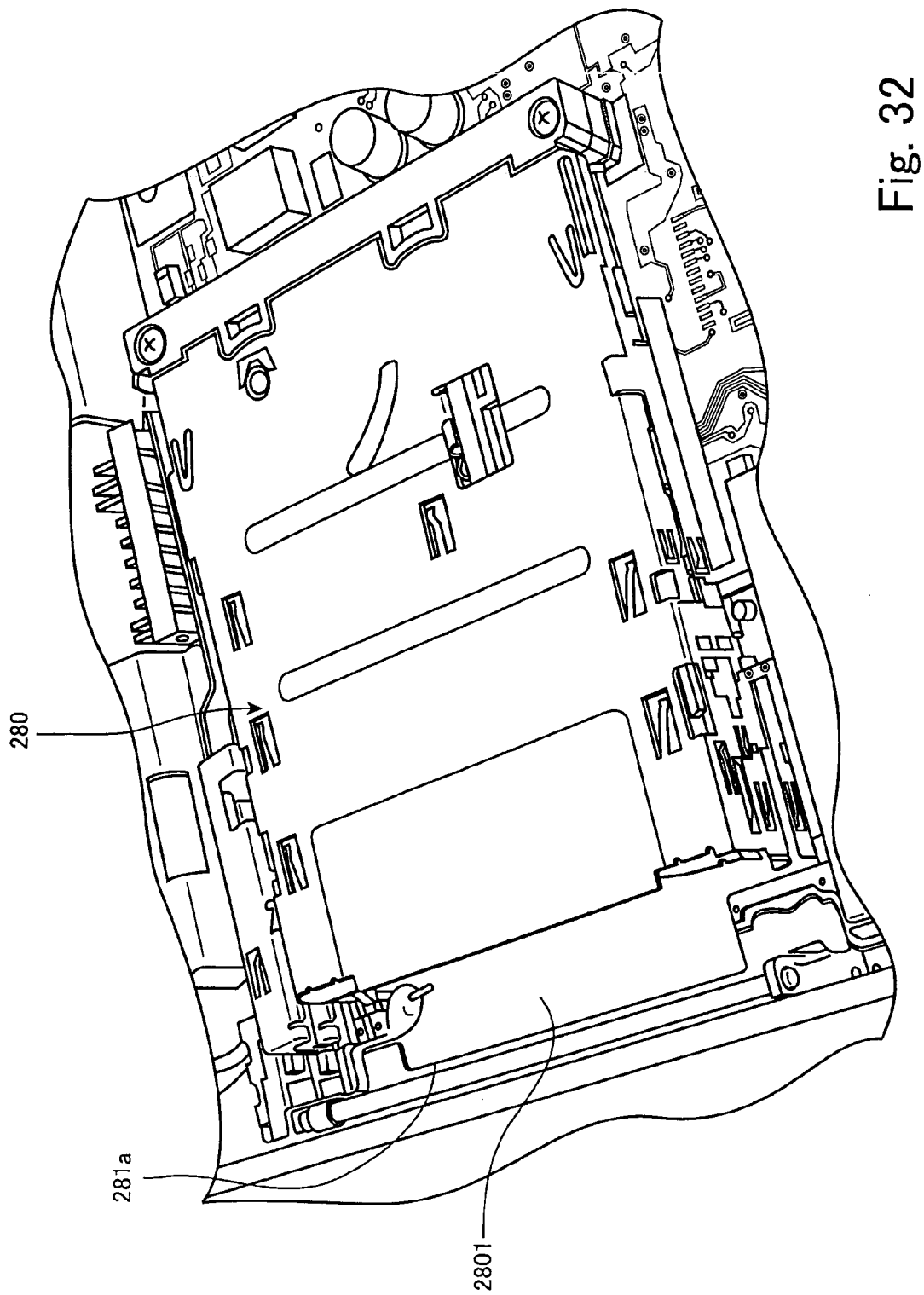
FIG. 32 is a perspective view of the PC card slot 280.
Figure 33:
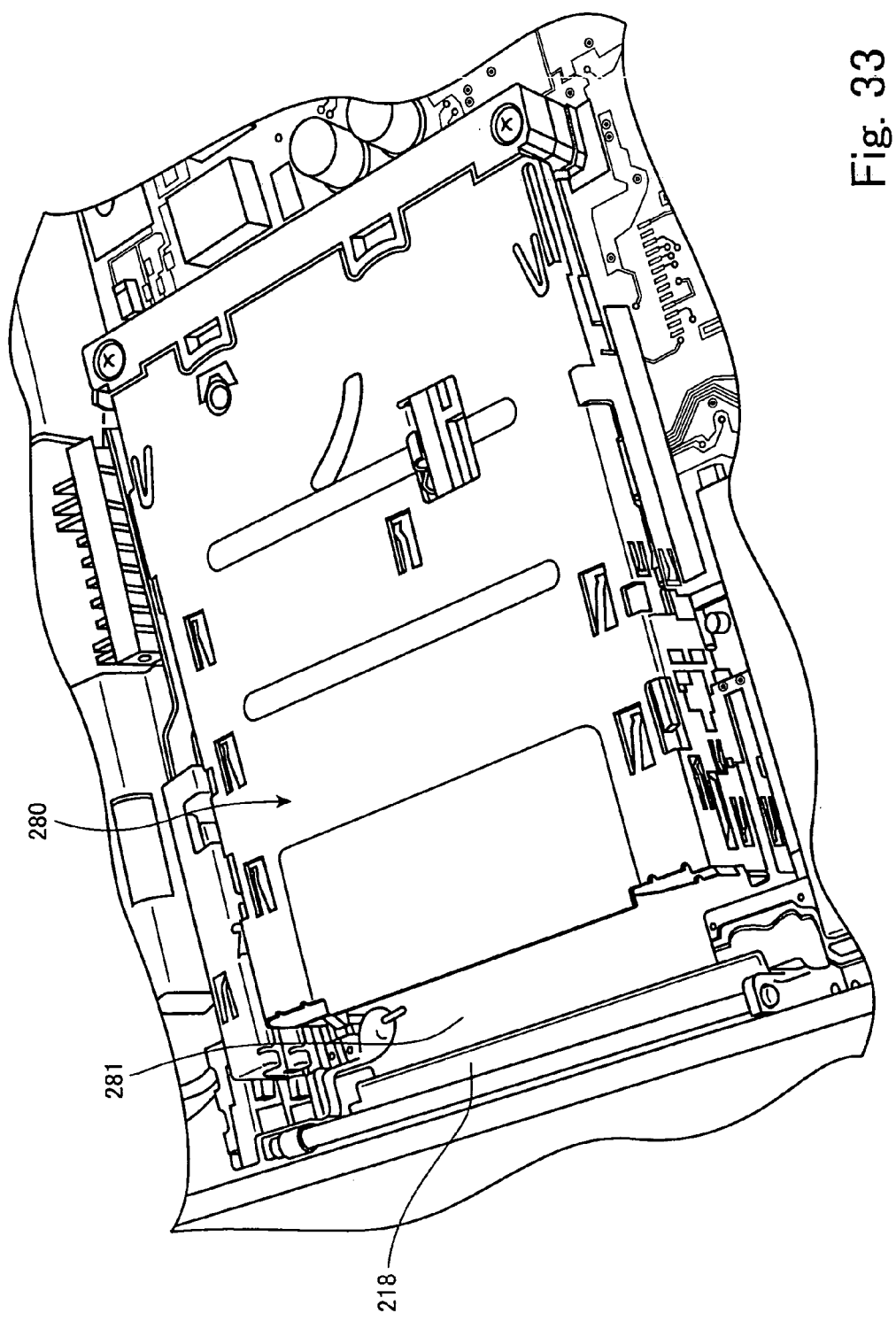
FIG. 33 is a perspective view of the PC card slot shown in FIG. 32, with the lower cover member shown in FIG. 6 opened.

FIG. 32 is a perspective view of the PC card slot 280, FIG. 33 is a perspective view of the PC card slot 280 shown in FIG. 32, with the lower cover member shown in FIG. 6 opened.

The PC card slot 280 is disposed in the housing of the notebook PC 10 inside the PC card loading opening 216 (see FIG. 6) formed in the flank of the right side of the notebook PC 10, such that it faces the PC card loading opening 216. The PC card slot 280 is consisted of a metal frame and configured to accommodate two PC cards vertically which are inserted in the PC card loading opening 216. A circuit board mounted with circuits for accessing a PC card inserted in the PC card slot 280 is provided under the PC card slot 280. An insulation sheet 2801, whose front end 2801a extends close to the PC card loading opening 216 (see FIG. 6), is spread between the circuit board and the PC card slot 280 of metal frame for securing electrical insulation therebetween.

As described in FIG. 6, the PC card loading opening 216 is configured such that the upper and lower cover members 217 and 218 are openably closed. A PC card is received by the PC card loading opening 216 as follows: when a PC card is inserted into the PC card loading opening 216, the upper cover member 217 is pressed by the front end of the PC card and rotated such that the upper cover member 217 is lifted up around the top edge 217a thereof; when the lower cover member 218 is pressed by the front end of the PC card, the lower cover member 218 is rotated such that the lower cover member 218 goes down around the bottom edge 218a thereof.

FIG. 33 shows the state that the lower cover member 218 of the two cover members for closing the PC card loading opening 216 is opened. The opened cover member 218 covers the front end 2801a of the insulation sheet 2801, which prevents the PC card inserted in the PC card loading opening 216 from abutting the front end 2801a of the insulation sheet 2801 and thus the insulation sheet 2801 from being turned up.

Figure 34:
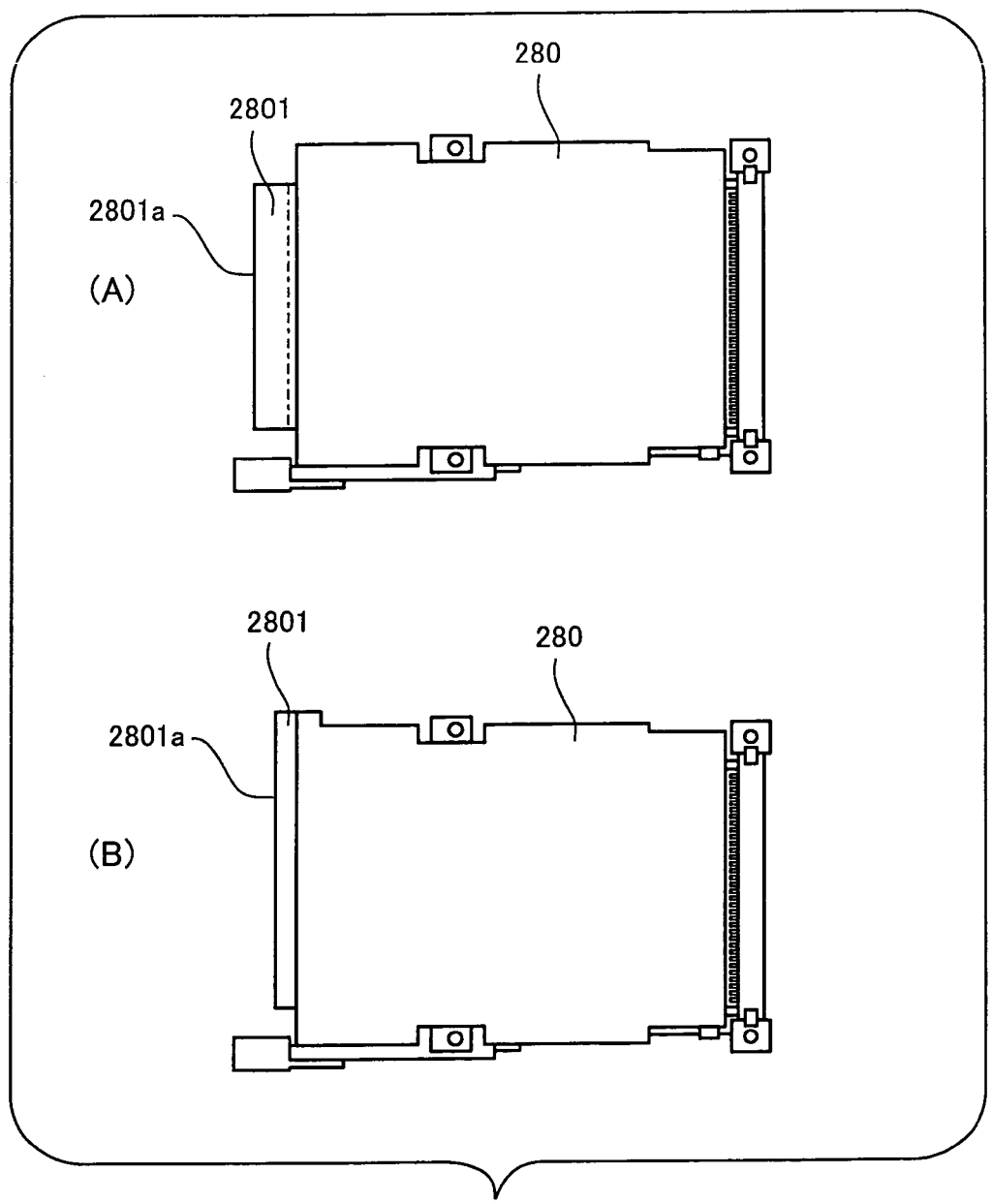
FIG. 34 compares the PC card slot (A) according to the embodiment of the notebook PC of the invention with a typical example of the conventional PC card slot (B)

FIG. 34 compares the PC card slot (A) according to the embodiment of the notebook PC of the invention with a typical example of the conventional PC card slot (B).

In the case of the typical conventional PC card slot (B), the front end of the insulation sheet 2801 is adhered onto a circuit board thereunder by using a double side tape. The front end of the circuit board is flush with the front end 2801a of the insulation sheet 2801. Thus, if a PC card is inserted downward and obliquely, the front end of the PC card abuts the front end 2801a of the insulation sheet 2801. Frequent occurrence of such abutting causes the front end 2801a of the insulation sheet 2801 to be turned up and thereby damaging the circuit board by the front end of the PC card, leading to malfunction of the apparatus.

On the other hand, in the notebook PC of the embodiment, the circuit board is shorter relative to the typical conventional PC card slot (B), as indicated by dotted lines in FIG. 34 (A), and the insulation sheet 2801 is extended closer to the PC card loading opening 216 (see FIG. 6). Accordingly, as shown in FIG. 32, the front end 2801a of the insulation sheet 2801 is covered by the downwardly opened cover member 218, which prevents the insulation sheet 2801 from being turned up and thereby prevents damage of the circuit board. Additionally, the need to adhere the insulation sheet 2801 onto the circuit board is eliminated, resulting in decrease in the number of assembly works.

(Structure of Disc Drive Unit)

Figure 35:
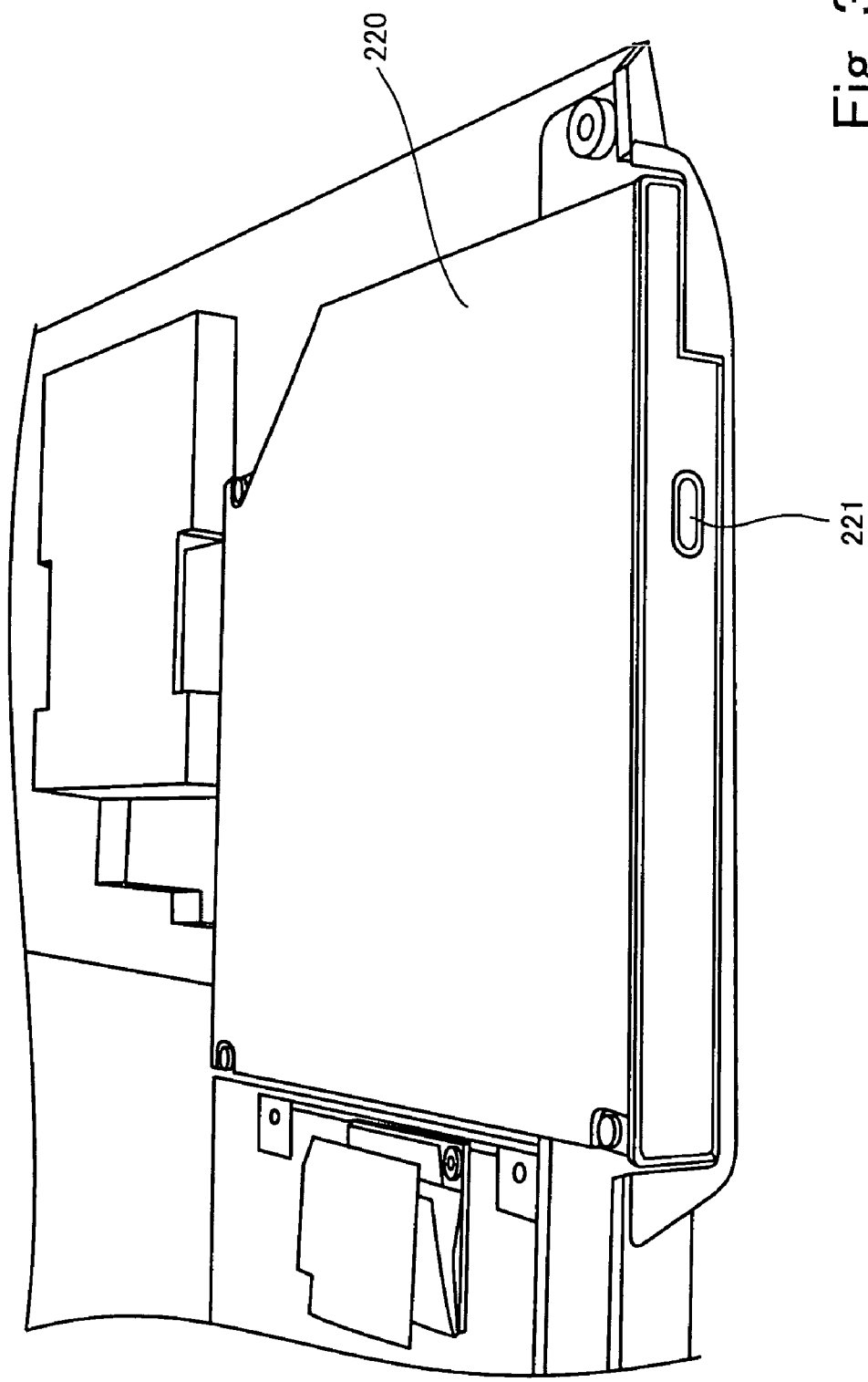
FIG. 35 is a perspective view of the disc drive unit with the top cover of the housing of the main unit of the notebook PC removed therefrom.

FIG. 35 is a perspective view of the disc drive unit 220 with the top cover of the housing of the main unit 20 of the notebook PC 10 removed therefrom.

The disc drive unit 220, as shown in FIG. 7, is inserted from the opening formed in the left-side flank of the housing of the main unit 20 to be housed therein.

Figure 36:
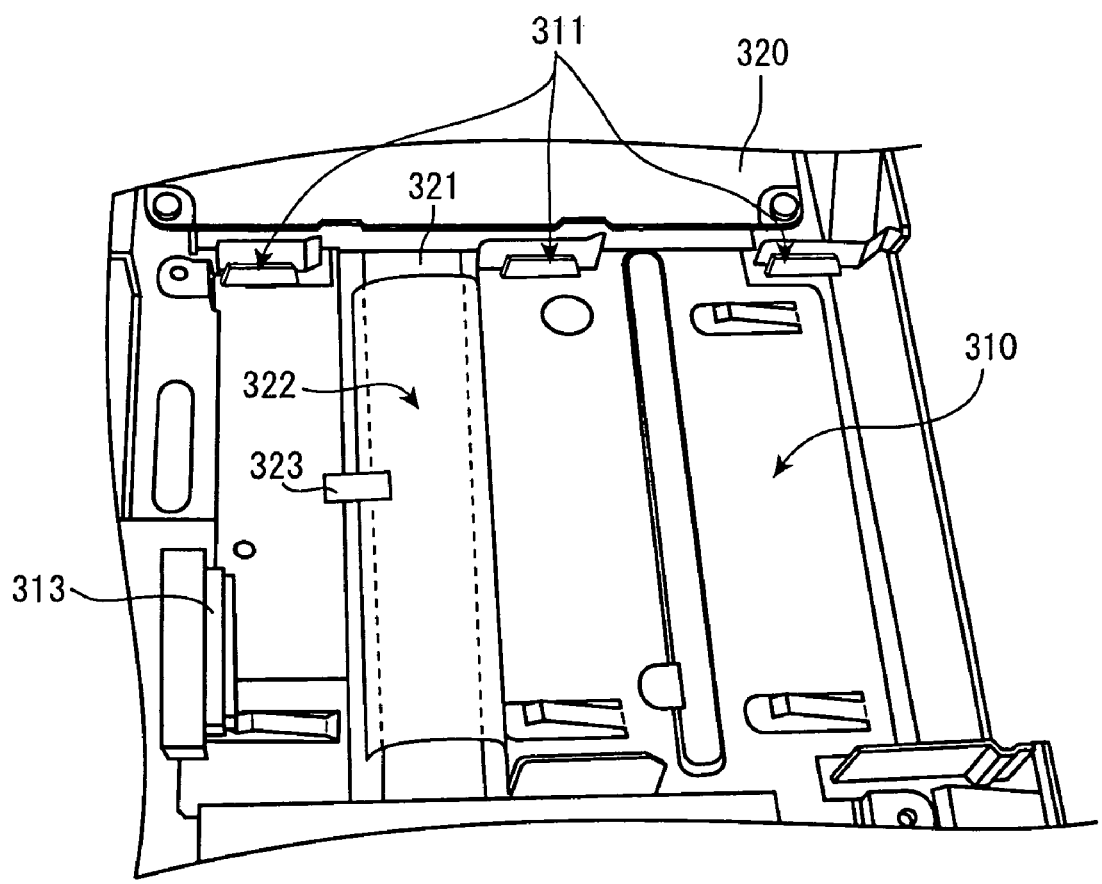
FIG. 36 shows a disc drive unit accommodating section to accommodate the disc drive unit.
Figure 37:
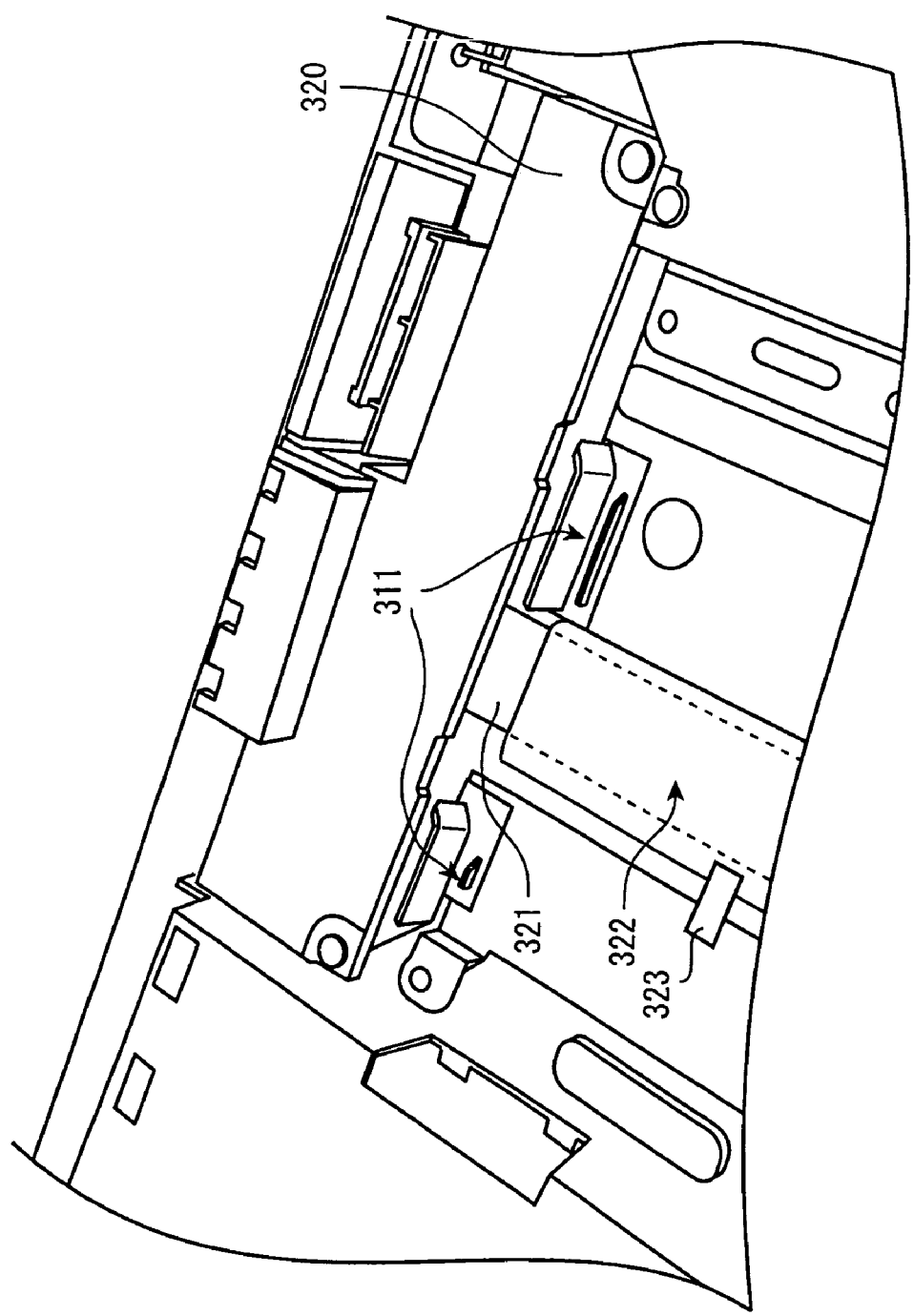
FIG. 37 shows one side-end of the disc drive unit accommodating section.
Figure 38:
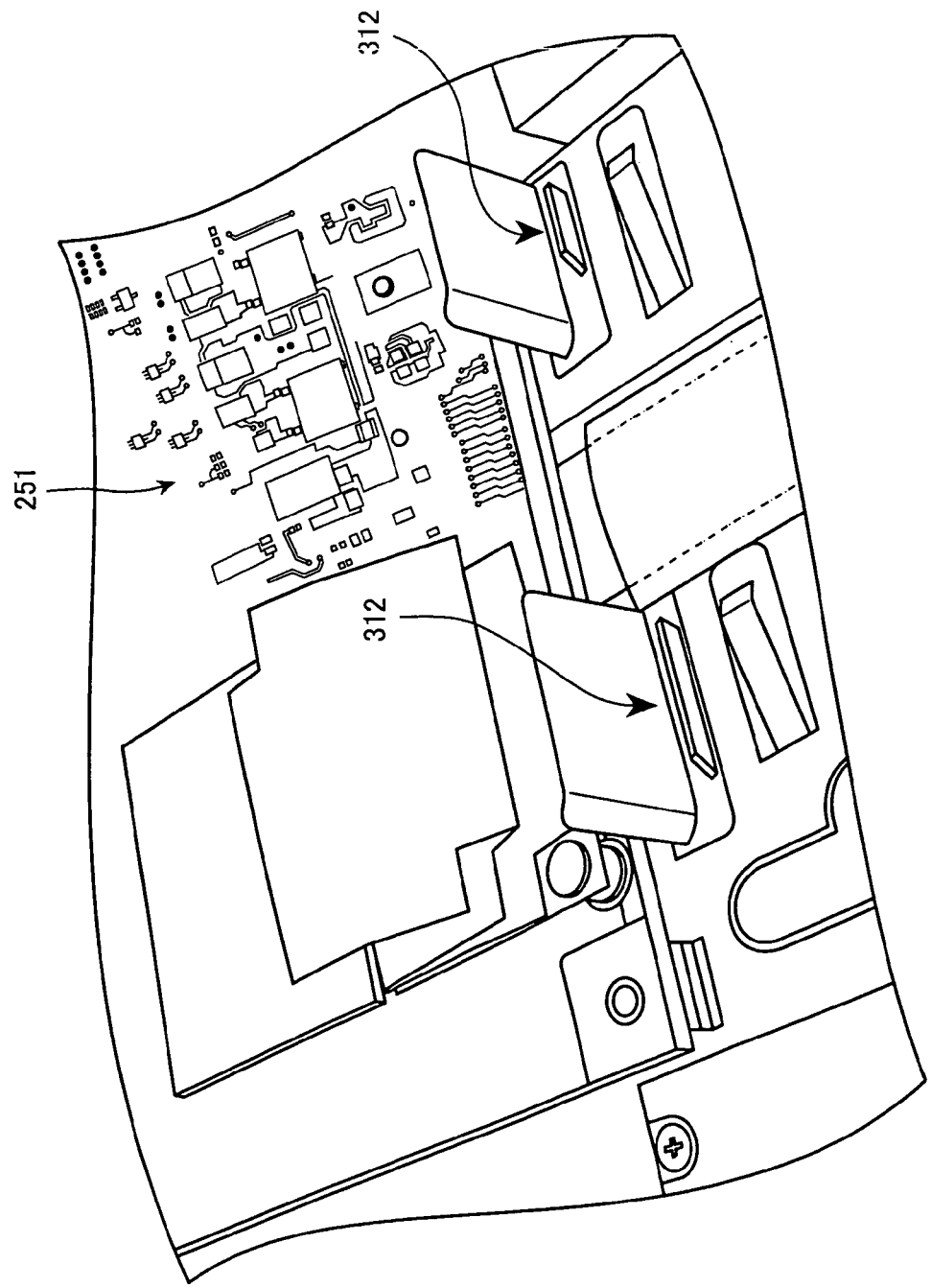
FIG. 38 shows the other side-end of the disc drive unit accommodating section.

FIG. 36 shows a disc drive unit accommodating section to accommodate the disc drive unit 220, FIG. 37 shows one side-end of the disc drive unit accommodating section 310, and FIG. 38 shows the other side-end thereof.

When the disc drive unit 220 is accommodated in the disc drive unit accommodating section 310 while guided by rails 311, 312 in the both sides thereof and inserted into the position where a connector (not shown) of the disc drive unit 220 is engaged with an apparatus side connector 313. The face of the inserted disc drive unit 220 becomes flush with that of the housing of the main unit 20 of the notebook PC 10 as shown in FIG. 7.

The main circuit board 251 (see FIG. 38) and a sub circuit board 320 (see FIG. 36) are disposed at the both sides of the disc drive unit accommodating section 310. Thus, a flat cable 321 for electrically connecting the main circuit board 251 and the sub circuit board 320 is laid across the disc drive unit accommodating section 310. The flat cable 321 may be a flexible wiring board. The flat cable 321 is arranged under the disc drive unit 220 after the disc drive unit 220 is accommodated in the disc drive unit accommodating section 310. Thus, without taking any precaution, the disc drive unit 220 inserted into the disc drive unit accommodating section 310 may be caught on the flat cable 321, leading to failures such as disconnection. Therefore, a sheet 322 is provided such that the flat cable 321 is wrapped by the sheet 322 folded back at a position close to the opening for the disc drive unit 220. The sheet 322 is adhered to a face of the disc drive unit accommodating section 310 at a position away from the opening for the disc drive unit 220 by using an adhesive tape 323.

As the flat cable 321 is wrapped by the sheet 322, it is possible to prevent the disc drive unit 220 inserted into the disc drive unit accommodating section 310 from being caught on the flat cable 321 and thus occurrence of failures such as disconnection can be prevented.

Figure 39:
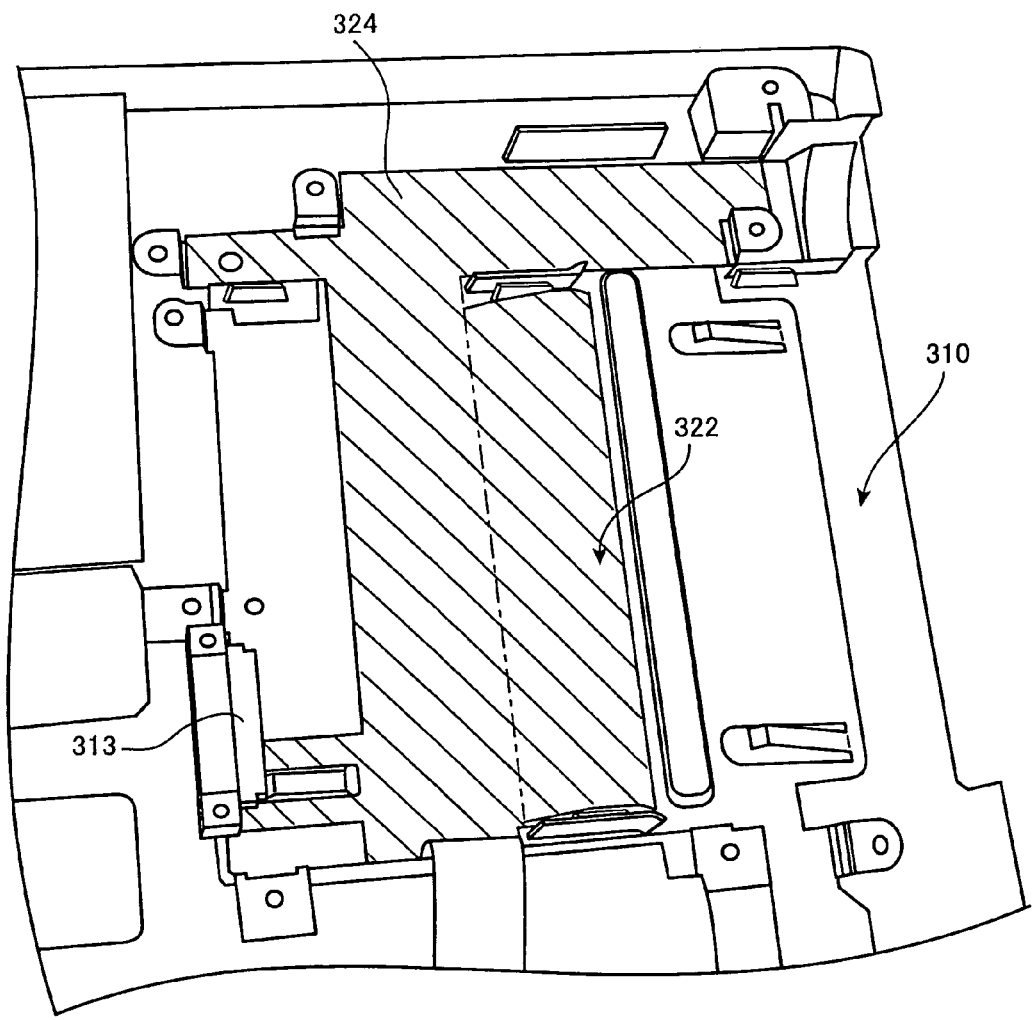
FIG. 39 shows a sheet to be spread under a sub circuit board, with the sub circuit board and a flat cable removed therefrom.

FIG. 39 shows a sheet to be spread under the sub circuit board 320, with the sub circuit board 320 and the flat cable 321 removed therefrom.

An insulation sheet 324 is spread under the sub circuit board 320 for insulating electrical connection between the sub circuit board 320 and the housing of the main unit 20. It should be noted that the sheet 322, which wraps the flat cable 321 as shown in FIGS. 36 and 37, is formed by extending the insulation sheet 324. This suppresses increase in the number of the components.

Figure 40:
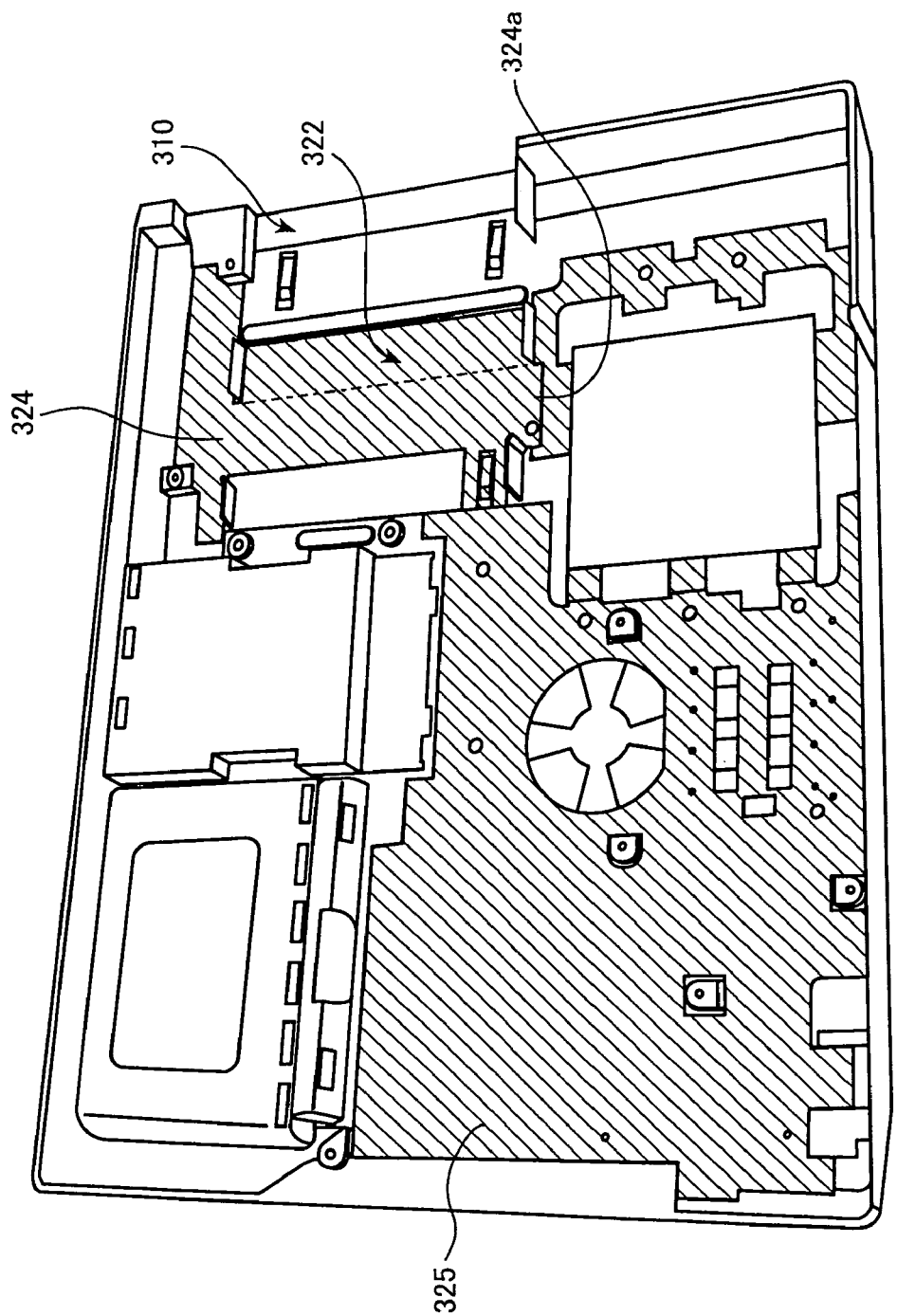
FIG. 40 shows an insulation sheet that is spread under the main and sub circuit boards with the circuit boards removed therefrom.

FIG. 40 shows an insulation sheet that is spread under the main and sub circuit boards 251, 320, with the circuit boards 251, 320 removed therefrom.

An insulation sheet 325 is laid under the main circuit board 251. The insulation sheet 324 laid under the sub circuit board 320 and the insulation sheet 325 laid under the main circuit board 251 overlap at least at the front end 324*a* of the insulation sheet 324 that extends across the disc drive unit accommodating section 310 to the side of the main circuit board 251.

According to the embodiment, it is intended to prevent the disc drive unit 220 inserted into the disc drive unit accommodating section 310 from being caught on the flat cable 321, by using the insulation sheet 324 for the sub circuit board 320 to wrap the flat cable 321 running across the disc drive unit accommodating section 310.

What is claimed is:

1. An electronic apparatus comprising:
   a housing including an opening formed therein for accommodating a unit that has a unit side connector;
   an apparatus side connector that is disposed at the back of the opening so as to be seen through the opening, and is to be connected with the unit side connector; and
   a projection that prevents wrong operation, the projection protruding from a sidewall of the opening toward inside the opening, the projection evading interference with the unit when the unit is placed in the opening in a normal posture and inserted in the apparatus side connector, the projection interfering with the unit when the unit is pressed toward the apparatus side connector, while at least an end of the unit, which is positioned opposite the unit side connector, is lifted.

2. The electronic apparatus according to claim 1, wherein the projection is formed at each of both side walls of the opening.

3. The electronic apparatus according to claim 1, wherein the unit has a metal frame with an interfering section that interferes with the projection when the unit is pressed against the apparatus side connector while at least a front end of the unit is lifted.

4. The electronic apparatus according to claim 1, wherein the unit side connector has a plurality of connection pins aligned in upper and lower rows, and
   the apparatus side connector has a plurality of insertion holes aligned in upper and lower rows in which the connection pins aligned in the upper and lower rows are inserted respectively.

5. The electronic apparatus according to claim 1, wherein the unit has a built-in hard disc and accesses the hard disc.

6. The data processing apparatus according to claim 1, further comprising:
   a main unit that serves for data processing and has a keyboard at a top surface thereof, the keyboard having aligned keys for input operation; and
   a display unit that has a display screen for displaying an image and is connected via a hinge to the main unit at the back of the main unit so as to be openable and closable relative to the main unit,
   wherein the opening is formed in a bottom surface of the main unit.

* * * * *